Figure 9:
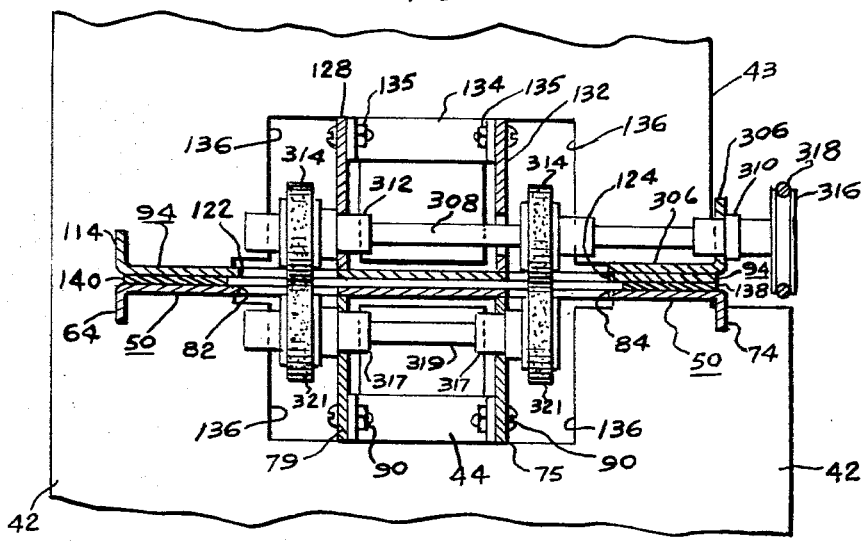

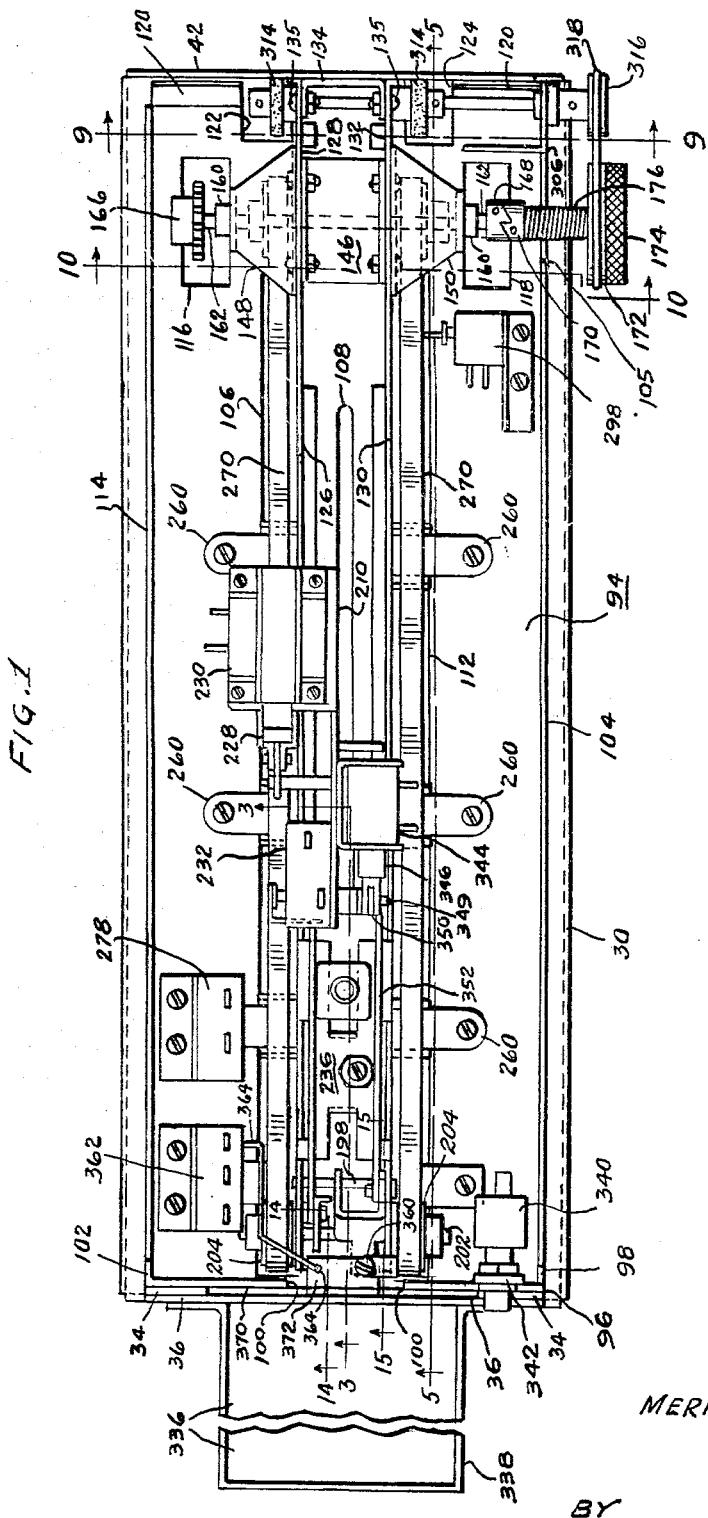

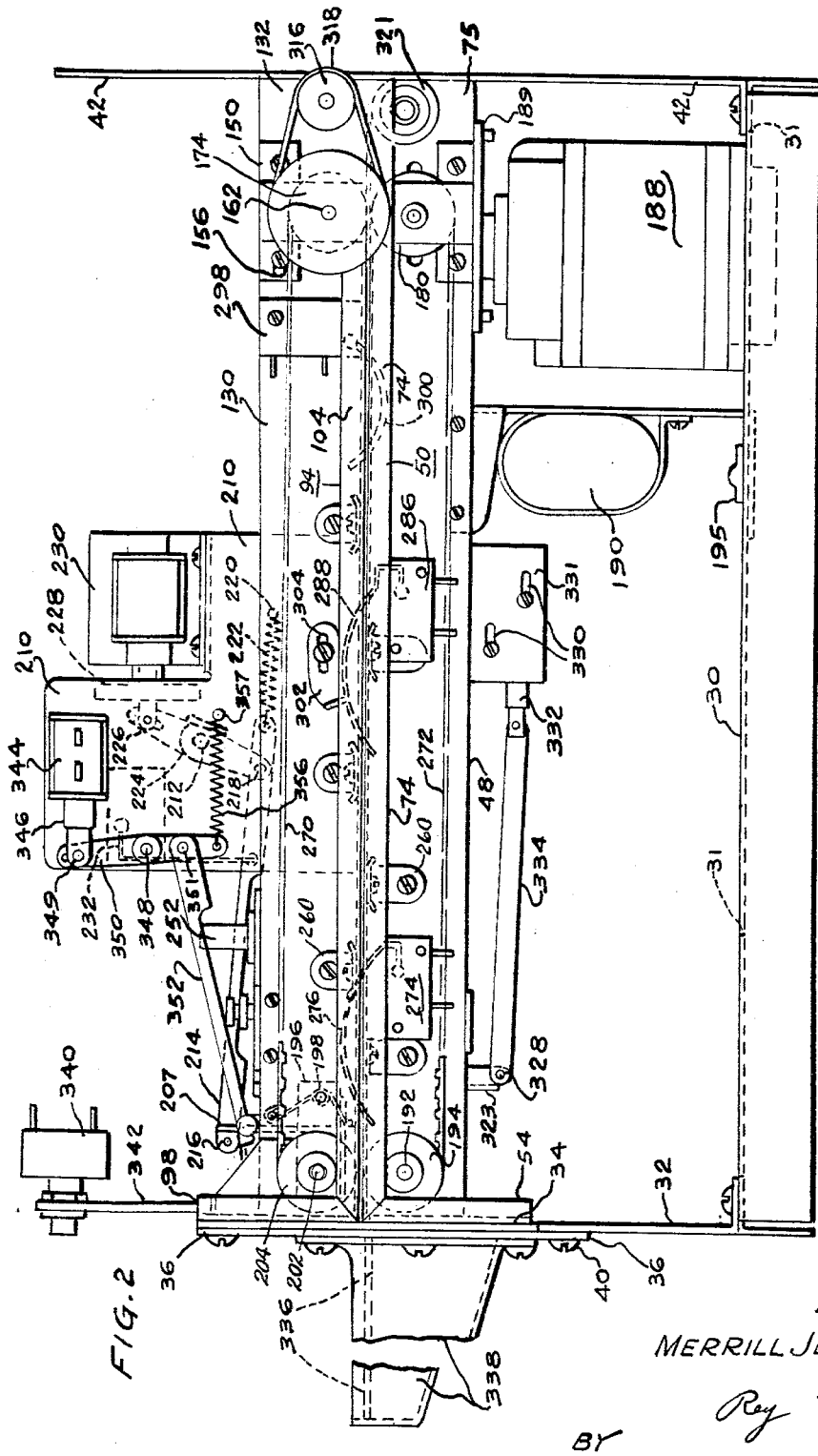

May 31, 1966 M. JENKINS 3,253,709
CURRENCY DETECTORS
Filed Oct. 20, 1960 13 Sheets-Sheet 3
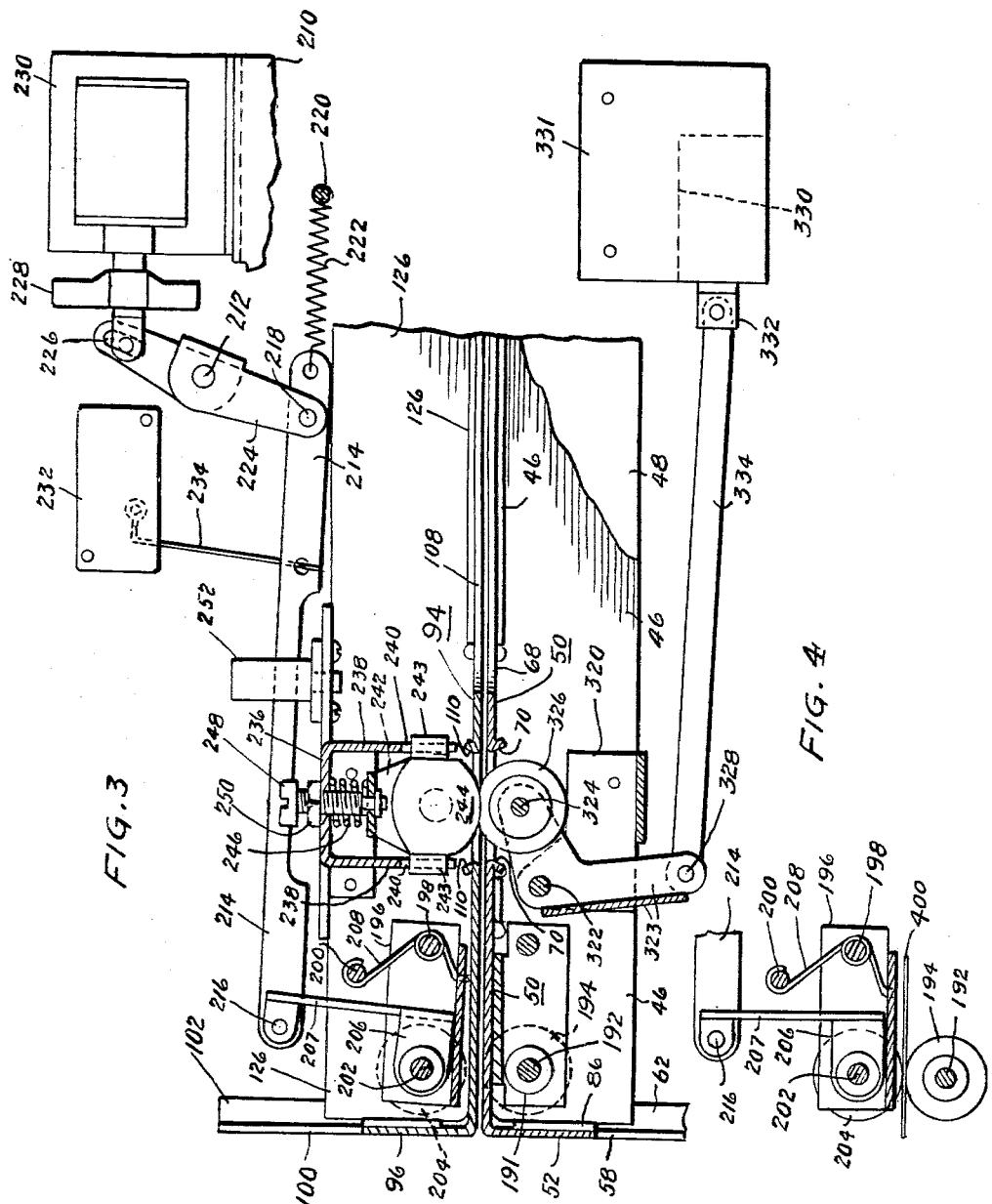
INVENTOR.
MERRILL JENKINS
BY Ray Eilers
ATT'Y.

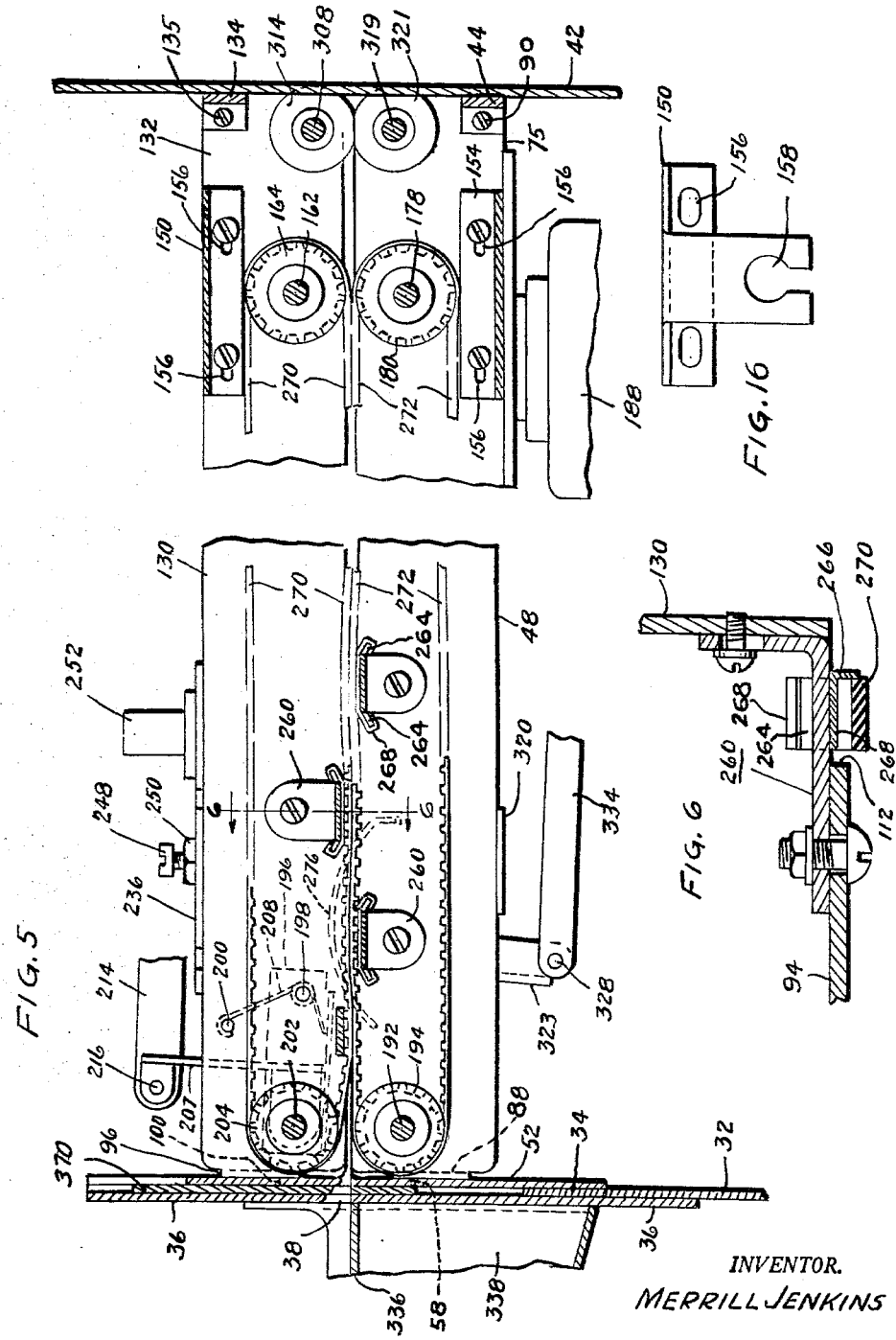

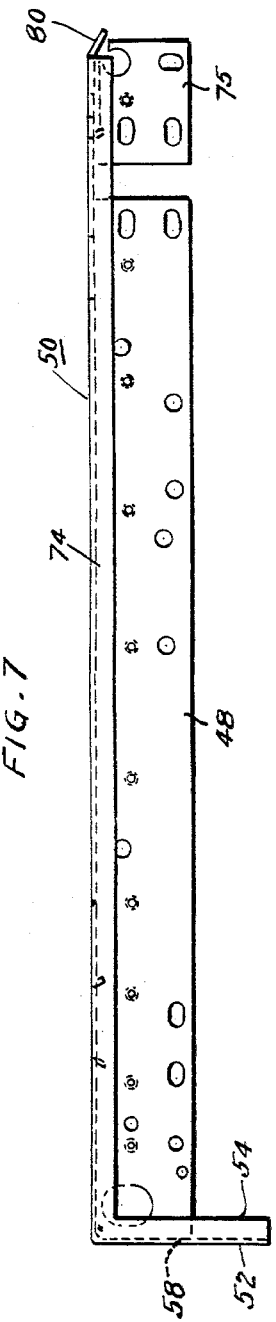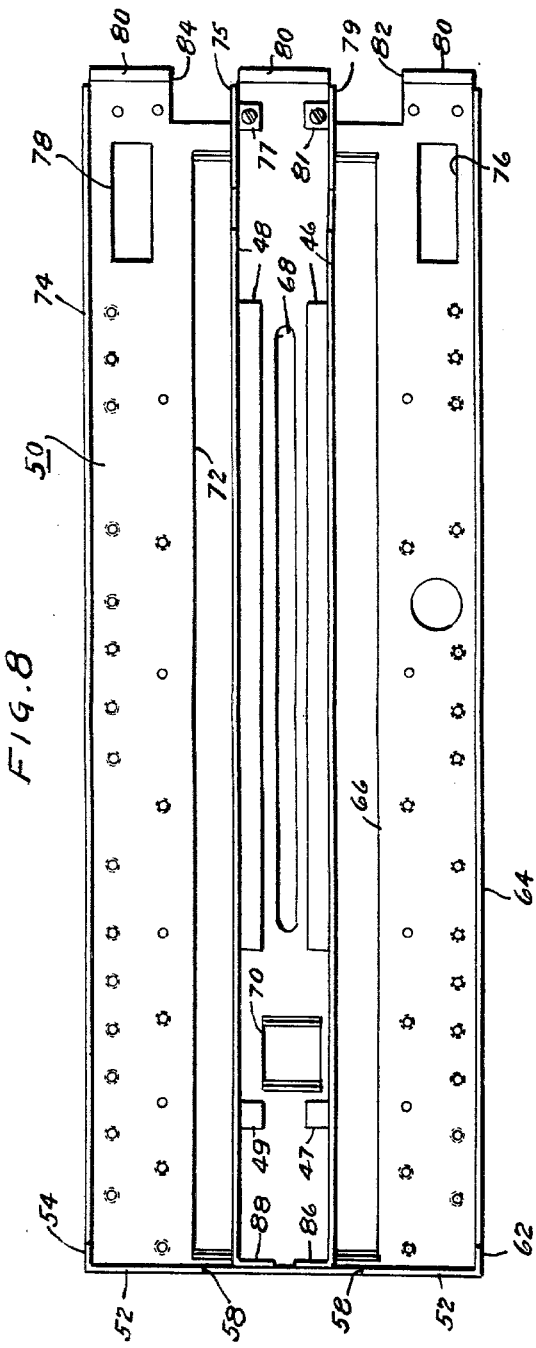

May 31, 1966  M. JENKINS  3,253,709
CURRENCY DETECTORS
Filed Oct. 20, 1960  13 Sheets-Sheet 6

INVENTOR.
MERRILL JENKINS
BY Rey Eilers
ATT'Y.

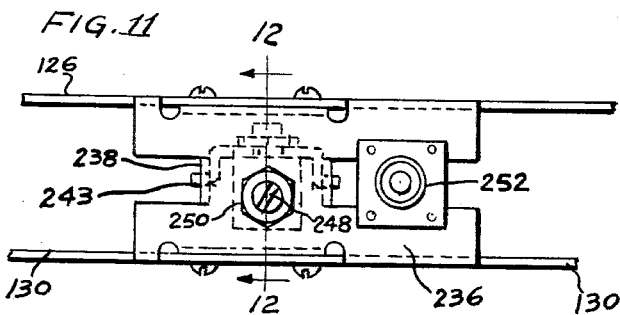
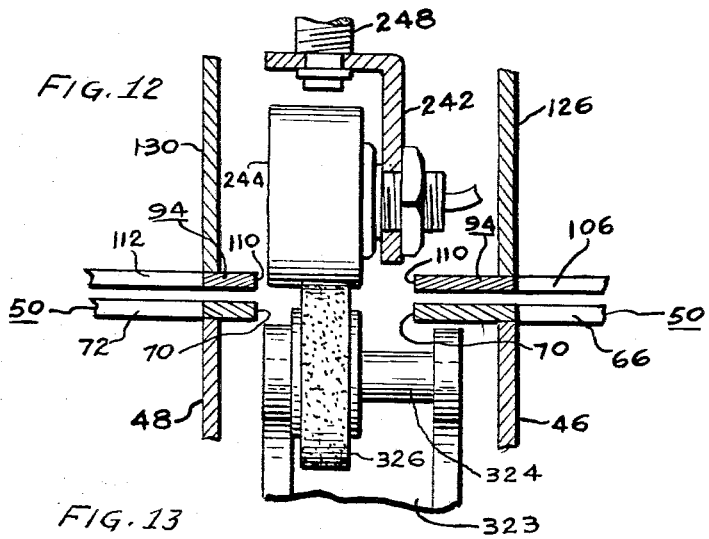
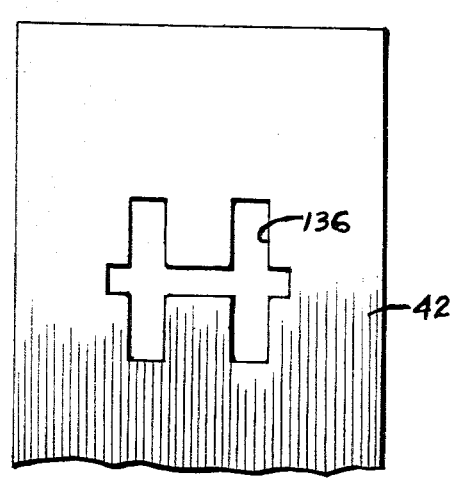

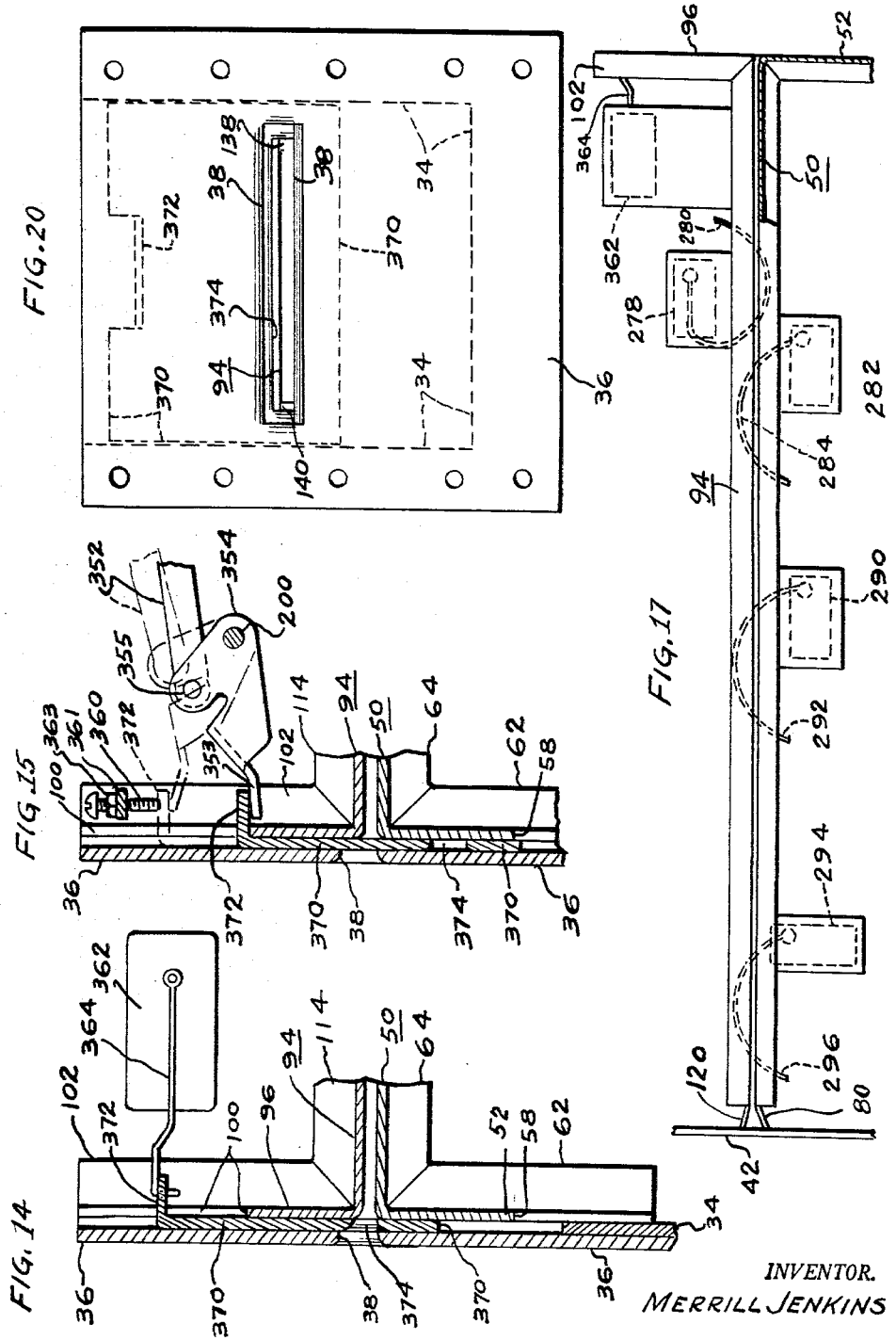

May 31, 1966  M. JENKINS  3,253,709
CURRENCY DETECTORS
Filed Oct. 20, 1960  13 Sheets-Sheet 9

INVENTOR
MERRILL JENKINS
BY Rey Eluis ATT'Y.

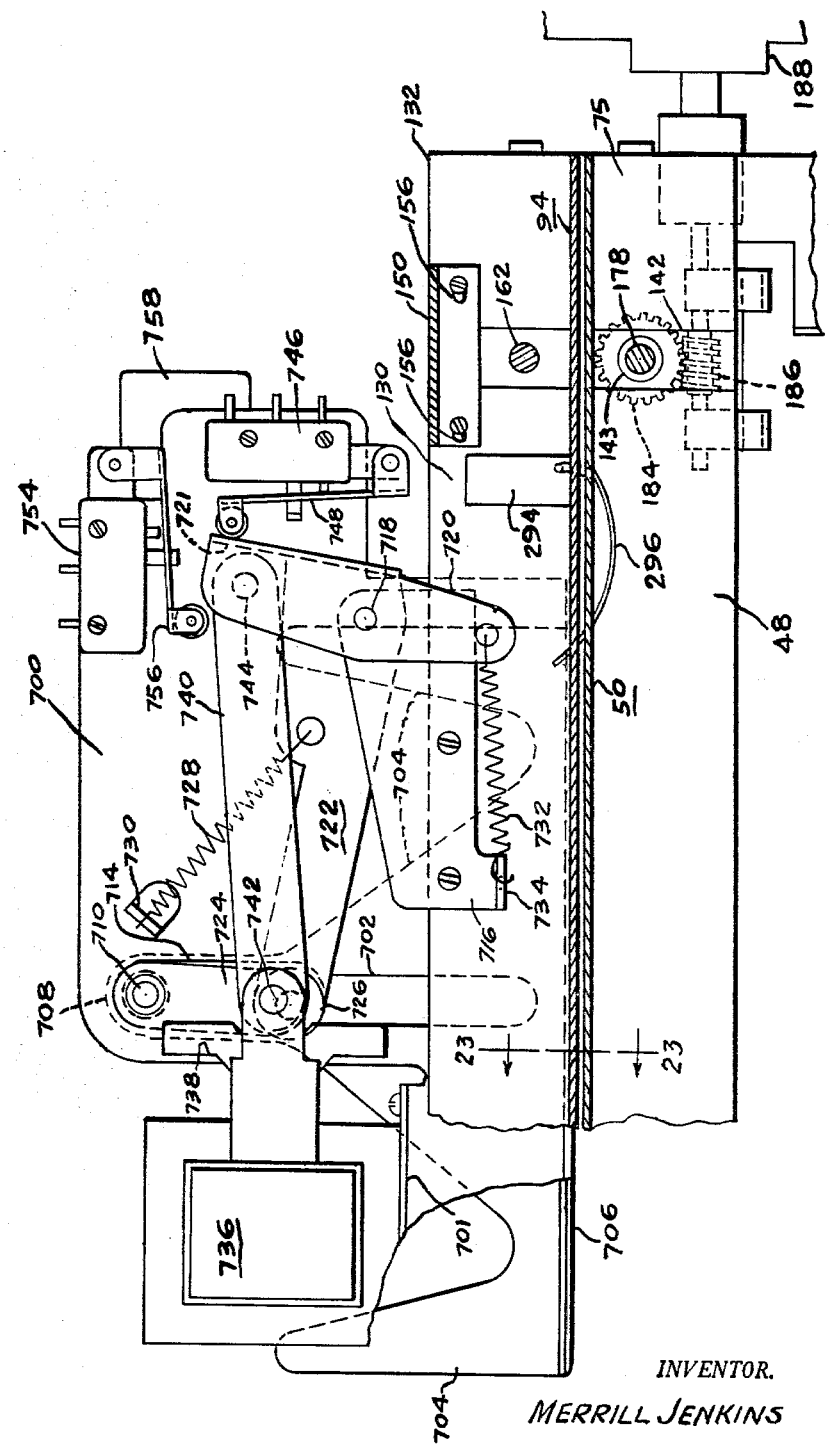

May 31, 1966  M. JENKINS  3,253,709
CURRENCY DETECTORS

Filed Oct. 20, 1960  13 Sheets-Sheet 13

INVENTOR.
MERRILL JENKINS

BY Rey Eilers
ATT'Y.

United States Patent Office 3,253,709
Patented May 31, 1966

3,253,709
CURRENCY DETECTORS
Merrill Jenkins, St. Louis County, Mo., assignor to National Rejectors, Inc., St. Louis, Mo., a corporation of Missouri
Filed Oct. 20, 1960, Ser. No. 87,472
(Filed under Rule 47(b) and 35 U.S.C. 118)
43 Claims. (Cl. 209—111.7)

This invention relates to improvements in currency detectors. More particularly, this invention relates to improvements in methods and apparatus for identifying authentic paper currency.

It is therefore an object of the present invention to provide an improved method and apparatus for identifying authentic paper currency.

In the identification of authentic paper currency, it has heretofore been proposed to use a bill-transporting device which has belts that grip the sides of an inserted bill and that move that bill past a sensing element; and such a device is workable. However, the bills which are inserted in such a device can occasionally tend to skew as they are moved by the belts; and any such skewing is objectionable. Such skewing is objectionable because it could lead to lack of orientation between the sensing element and that portion of the inserted bill which is to be sensed. Such skewing is also objectionable because it could lead to crumpling or tearing of the inserted bill. It would be desirable to provide a bill-transporting device which has belts that grip the sides of a bill and that move that bill and which prevents skewing of that bill as the belts move that bill past the sensing element. The present invention provides such a bill-transporting device; and it is therefore an object of the present invention to provide a bill-transporting device which has belts that grip the sides of a bill and that move that bill and which prevents skewing of that bill as the belts move the bill past the sensing element.

The bill-transporting device provided by the present invention has guide plates which are immediately adjacent the sides of the inserted bill, and the belts of that bill-transporting device holds the sides of that bill in register with those guide plates. The inserted bill can move with the belts and not even touch the guide plates as long as the axis of that bill remains parallel to the paths of movement of the belts; but the sides of that bill will engage, and be held against skewing by, those guides plates in the event that bill tends to become skewed. In this way, the guide plates limit the tendency of the inserted bill to skew as it is moved by the belts. It is therefore an object of the present invention to provide a bill-transporting device which has guide plates that are immediately adjacent the sides of an inserted bill and that tend to keep that bill from skewing as it is moved by the belts.

The belts of the bill-transporting device provided by the present invention must grasp an inserted bill, must move that bill past a sensing element, and must then move that bill to a discharge area. As a result, those belts must be relatively long; and it is necessary that those belts be recurrently urged into intimate engagement with each other along their lengths. The bill-transporting device provided by the present invention recurrently urges the belts thereof into intimate engagement with each other along their lengths by giving those belts undulating configurations. Such configurations recurrently force the confronting faces of the belts into intimate engagement with an inserted bill and thereby provide tight gripping of that bill by the belts. It is therefore an object of the present invention to provide undulating configurations for the belts in a bill-transporting device.

The belts of the bill-transporting device provided by the present invention initially have their leading edges spaced apart to facilitate the ready introduction therebetween of the leading edge of an inserted bill. Once the leading edge of the inserted bill has been introduced between the leading edges of the belts, the leading edges of those belts will be urged together to grip the sides of the inserted bill. The leading edges of the belts will then remain immediately adjacent each other until the inserted bill has been tested. If the bill is accepted and is delivered to the discharge area, the leading edges of the belts will be moved back to their initially spaced-apart positions to facilitate the introduction therebetween of the leading edge of a further inserted bill. If the tested bill is rejected and is returned to the patron, the leading edges of the belts will be moved back to their initially spaced-apart positions to release the inserted bill and also to to facilitate the introduction therebetween of the leading edge of another inserted bill. The bill-transporting device of the present invention thus provides belts that initially have their leading edges spaced apart, that have those leading edges moved into intimate engagement with each other after a bill has been inserted, that subsequently have their leading edges held in engagement with each other until the inserted bill has been tested, and that finally have their leading edges moved back to their initial, spaced-apart positions.

In the currency detector provided by the present invention, the sensing element is a magnetic head. That head is held by a mounting which is spring-biased toward an initial position but which can be moved a short distance away from that position. The movement of the mounting for the magnetic head is desirable because it enables a pressure member to be urged against that head by a solenoid. Without such movement of the mounting, the armature of the solenoid which drives the pressure member might not be able to seat fully; and such a result would be objectionable because a solenoid generates substantial quantities of stray magnetic flux lines as long as its armature is not fully seated. Further, the movement of the mounting is desirable because it enables the spring bias on that mounting to be determine the force which the magnetic head and the pressure member apply to an inserted bill. It is therefore an object of the present invention to provide a spring-biased mounting for the magnetic head of a currency detector.

The pressure member which urges the inserted bill against the magnetic head of the currency detector provided by the present invention is a soft-faced roller. The face of that roller is readily deformable; and that face can readily deform to assume a configuration which is complementary to the convex face of the magnetic head whenever that roller presses the inserted bill against that magnetic head. As a result, that portion of the face of the roller which is immediately adjacent the magnetic head will have a concave configuration that is complementary to the convex face of that magnetic head. Such a configuration assures full and intimate engagement of the inserted bill with the air gap of the magnetic head. It is therefore an object of the present invention to provide a soft-faced roller which has a readily deformable face that can press an inserted bill against a magnetic head and that can ssume a curvature which is complementary to that of the magnetic head.

The soft-faced roller is mounted so it can rotate readily as the inserted bill is moved past the magnetic head. Such rotation will minimize the frictional drag imposed upon the inserted bill; and it will also "work" the material in the soft face of that roller and thereby keep that material "live." The roller will rotate at such an angular rate that its peripheral speed will equal the speed at which the inserted bill is moved past the magnetic head; and this is desirable because it avoids slipping of the face of that roller relative to the inserted bill.

The bill-transporting device provided by the present invention has a number of switches that are disposed adjacent the belts and that are disposed along the length of the path of movement of an inserted bill. Those switches have actuators which extend transversely of the confronting faces of the belts and which normally lie in the path which which an inserted bill must follow. Those switch actuators will be engaged by the leading edge of the inserted bill and will be moved out of the path of that bill. Those switch actuators are disposed immediately adjacent the belts; and the portions of the inserted bill which engage those actuators will be receiving full and immediate support from the belts. As a result, those portions of the leading edge of the inserted bill will be able to resist any tendency to crumple or roll up as they engage those switch actuators. It is therefore an object of the present invention to mount bill-actuated switches immediately adjacent the belts of a bill-transporting device so those portions of the leading edge of an inserted bill which engage the said switch actuators will receive full and immediate support from those belts.

The spacing of the bill-actuated switches along the length of the path which an inserted bill must follow makes it possible to use the inserted bill to control the energization of the motor which drives the belts. Specifically, that spacing of the bill-actuated switches makes it possible to keep the motor energized as long as the inserted bill engages and holds the actuator of any of those switches. This is desirable because it obviates the need of a precisely controlled timing circuit. Further, this is desirable because it will keep the motor energized longer than usual in the event an inserted bill is temporarily caught and held within the bill-transporting device; and that longer-than-usual energization will give the bill a chance to free itself. It is therefore an object of the present invention to provide a bill-transporting device wherein a plurality of bill-actuated switches are spaced along the length of the path which the inserted bill must follow and wherein those switches control the operation of the motor of that bill-transporting device.

One of the bill-actuated switches in the bill-transporting device provided by the present invention is used to effect movement of the pressure member toward the magnetic head. Further, another of the bill-actuated switches in that bill-transporting device helps reverse the motor whenever an inserted bill is to be returned to the patron.

The bill-transporting device of the present invention can be provided with rollers that expel accepted bills from that bill-transporting device and direct those bills into a cash box. Those rollers can rotate at angular rates which will make the peripheral speeds of those rollers greater than the normal linear speed of the inserted bill. As a result, those rollers will speed up the movement of an inserted bill as that bill is being directed into the cash box. The resulting increased speed of movement of the inserted bill enables that bill to fully enter the cash box instead of merely falling downwardly from the discharge opening of the bill-transporting device.

Where desired, the inserted bill can be forced downwardly through a slot in the bill-transporting device and can be forced into a cash box beneath that device. Because the bill is forced down through the slot, that bill does not have to travel all the way to the rear of the bill-transporting device; and hence the overall time cycle of the bill-transporting device can be shortened. Further, because the bill is forced into the cash box, that cash box can be made smaller, and that cash box can hold the bills in a compact stack. It is therefore an object of the present invention to provide a bill-transporting device wherein the inserted bill can be forced downwardly through a slot in the bill-transporting device.

In the magnetic sensing of paper currency, it is essential to establish and maintain a high signal-to-noise ratio. Because the magnetic properties of the ink in paper currency are beyond the control of the manufacturer of currency detectors, and because those magnetic properties are very limited, the most practical way to increase the signal-to-noise ratio is to reduce the noise level. The present invention reduces the noise level by breaking magnetic paths in the frame of the currency detector. As a result, the flow of magnetoelectric currents in that frame which could lead to stray coupling is minimized.

In the operation of the bill-transporting device provided by the present invention, the belts are driven a longer period of time in the forward direction when the inserted bill is accepted than they are driven in that direction when the bill is rejected. The lesser time of driving in the forward direction when a bill is rejected facilitates the testing and returning of the rejected bill within the same overall length of time needed to test and accept that bill. It is therefore an object of the present invention to provide a bill-transporting device wherein the belts move longer in the forward direction when the inserted bill is accepted than they move in that direction when the inserted bill is rejected.

To minimize the length of time the belts move in the forward direction when the inserted bill is to be rejected, the present invention mounts a bill-actuated switch so it is actuated by the inserted bill immediately after that bill has been tested. If that bill is not acceptable, that switch will reverse the motor and cause the belts to return that bill to the patron; but if that bill is acceptable, that switch will permit the motor to continue to move the belts in the forward direction. It is therefore an object of the present invention to provide a bill-transporting device with a bill-actuated switch that is actuated by an inserted bill immediately after that bill has been tested and that will reverse the motor if that bill is not acceptable but that will permit the motor to continue to move the belts in the forward direction if that bill is acceptable.

The bill-transporting device provided by the present invention is equipped with a gate that closes after the inserted bill has been moved a certain distance by the belts. That gate prevents the insertion of a further bill during the cycling of the bill-transporting device; and it also senses the presence or absence of a thread, tape or other member which a patron could attach to the bill to try to recover that bill. By preventing the inserting of a further bill during the cycling of the bill-transporting device, the gate protects the patron against the loss of that further bill. By sensing for the presence or absence of a thread, tape or other member attached to the bill, the gate protects the operator of the bill-transporting device against the loss of that bill. It is therefore an object of the present invention to equip a bill-transporting device with a gate that closes after the inserted bill has been moved a certain distance by the belts.

The gate provided by the present invention is normally held out of the path of the inserted bill, and it normally holds the movable contact of a switch in a predetermined position. After the inserted bill has been moved a certain distance by the belts, that gate will move toward the path which the bill followed; and if a thread, tape or other member attached to the inesrted bill is not encountered, the movable contact of the switch will be able to move out of that predetermined position and thereby indicate that there is no thread, tape or other member attached to the bill. However, if a thread, tape or other member is encountered by the gate, that movable contact will not be able to move out of that predetermined position; and the failure of that movable contact to so move will indicate that there is a thread, tape or other member attached to the bill.

Other and further objects and advantages of the present invention should become apparent from an examination of the drawing and accompanying description.

In the drawing and accompanying description, two preferred embodiments of the present invention are shown and described but it is to be understood that the drawing and accompanying description are for the purpose of illustration only and do not limit the invention and that the invention will be defined by the appended claims.

Figure 10:
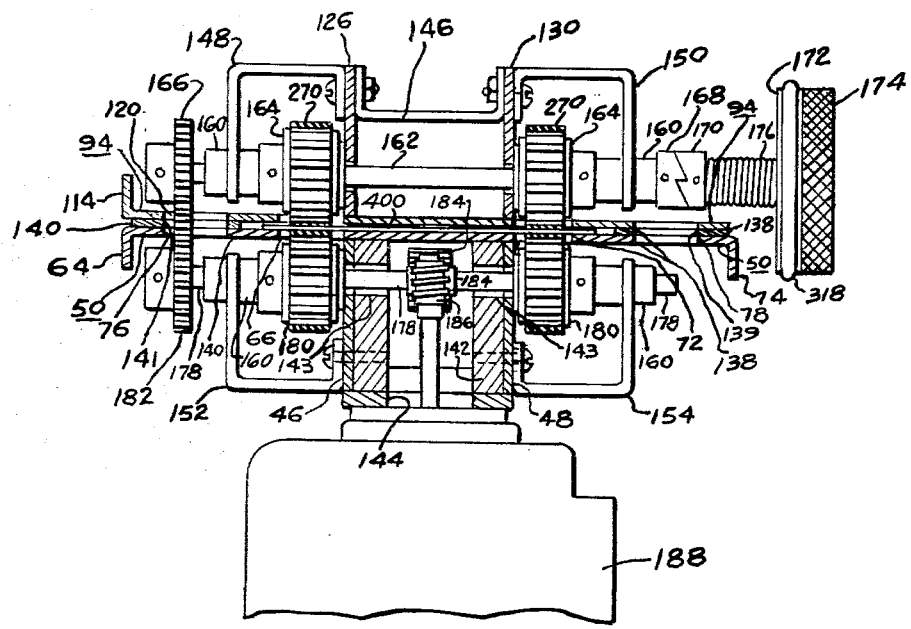

In the drawing, FIG. 1 is a broken, plan view of one embodiment of bill-transporting device that is made in accordance with the principles and teachings of the present invention, FIG. 2 is a broken, side elevational view of the embodiment of bill-transporting device shown in FIG. 1, FIG. 3 is a broken, sectional view through the embodiment of bill-transporting device shown in FIG. 1, and it is taken along the plane indicated by the line 3—3 in FIG. 1, FIG. 4 is a sectional view of a few of the components of FIG. 3, it is taken along the plane indicated by the line 3—3 in FIG. 1, and it shows the shaft-carrying bracket of FIG. 3 in lowered position, FIG. 5 is a broken, sectional view through the embodiment of bill-transporting device shown in FIG. 1, and it is taken along the plane indicated by the line 5—5 in FIG. 1, FIG. 6 is a sectional view, on a very large scale, through the embodiment of bill-transporting device shown in FIG. 1, and it is taken along the plane indicated by the line 6—6 in FIG. 5, FIG. 7 is a side elevational view of the lower platen and associated parts used in the embodiment of bill-transporting device shown in FIG. 1, FIG. 8 is a bottom view of the platen and associated parts shown in FIG. 7, FIG. 9 is a sectional view through the embodiment of bill-transporting device shown in FIG. 1, and it is taken along the plane indicated by the line 9—9 in FIG. 1, FIG. 10 is a sectional view through the embodiment of bill-transporting device shown in FIG. 1, and it is taken along the broken plane indicated by the line 10—10 in FIG. 1, FIG. 11 is a plan view, on an enlarged scale, through the bracket which holds the mounting for the magnetic head of the embodiment of bill-transporting device shown in FIG. 1, FIG. 12 is a sectional view, on a still larger scale, through the bracket of FIG. 11, and it is taken along the plane indicated by the line 12—12 in FIG. 11, FIG. 13 is an elevational view of the rear plate of the embodiment of bill-transporting device shown in FIG. 1, FIG. 14 is a sectional view, on a larger scale, through part of the embodiment of bill-transporting device shown in FIG. 1, and it is taken along the plane indicated by the line 14—14 in FIG. 1, FIG. 15 is a sectional view, on the scale of FIG. 14, through another part of the embodiment of bill-transporting device shown in FIG. 1, and it is taken along the plane indicated by the line 15—15 in FIG. 1, FIG. 16 is a side elevational view of a J-shaped bracket used in the embodiment of bill-transporting device shown in FIG. 1, FIG. 17 is a partially-sectioned side view of the platens of the embodiment of bill-transporting device shown in FIG. 1 after those platens have been rotated one hundred and eighty degrees about a vertical axis from the position shown by FIG. 2, and it shows the switches mounted on those platens.

Figure 18:
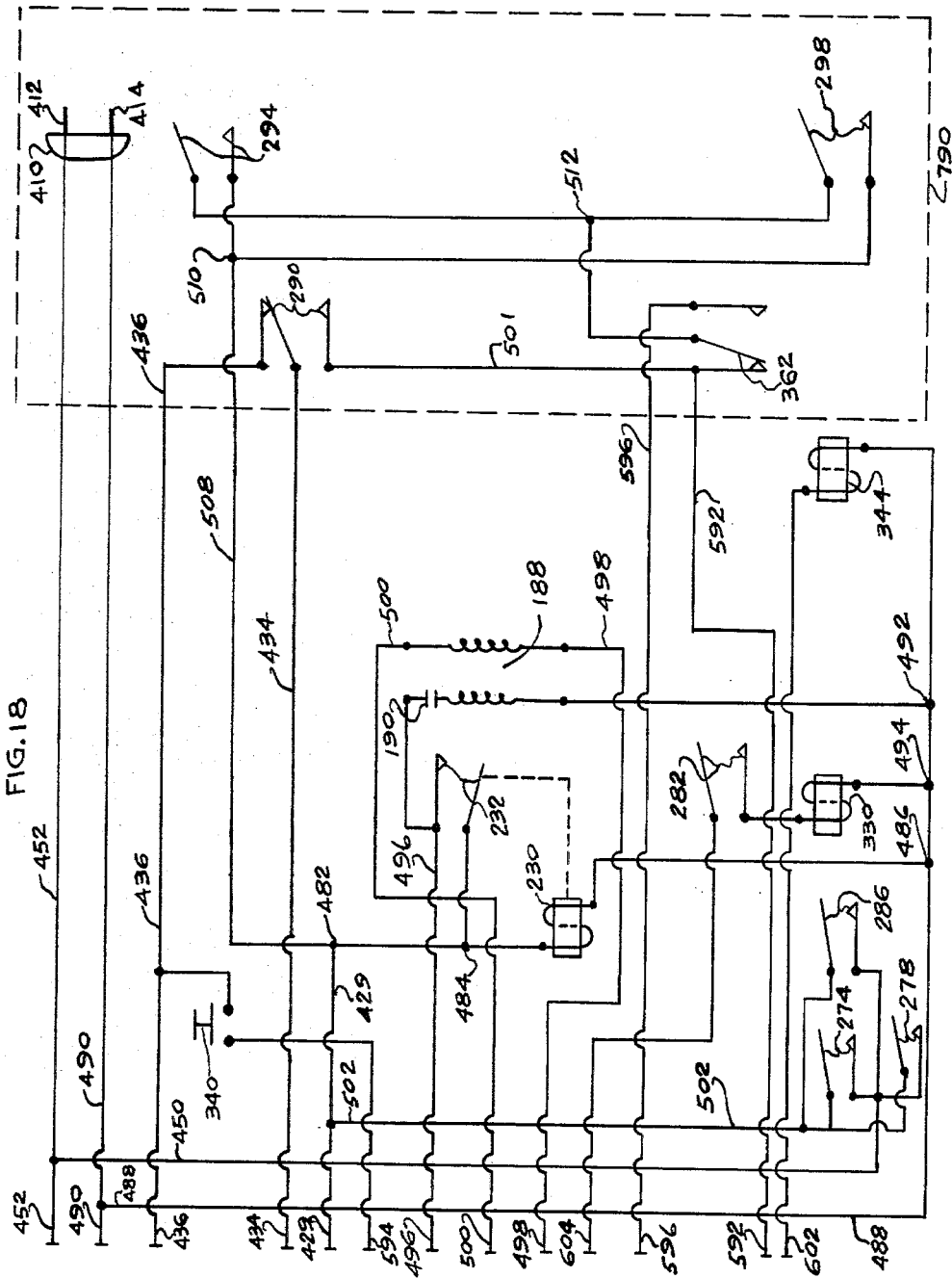
Figure 19:
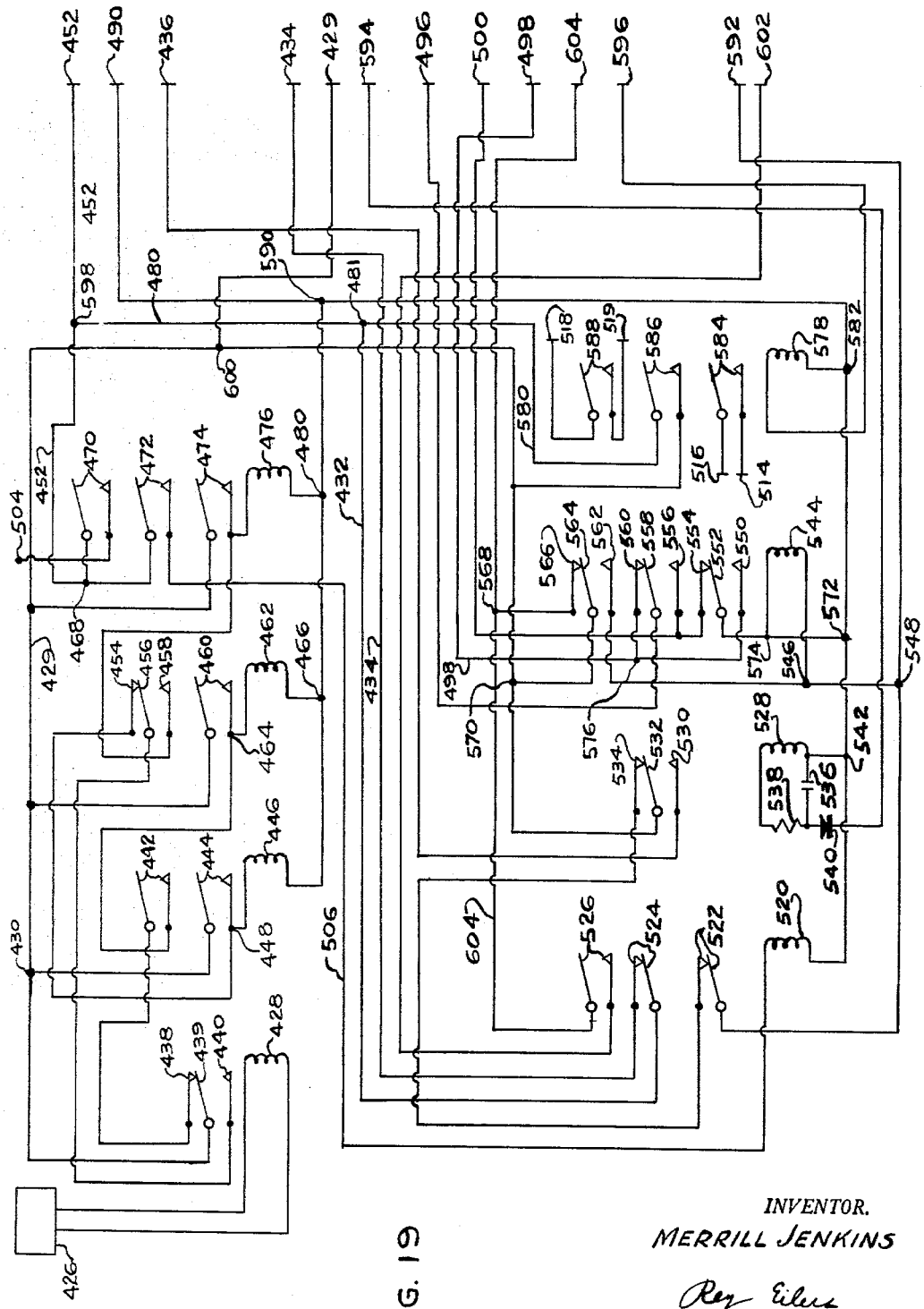
Figure 22:
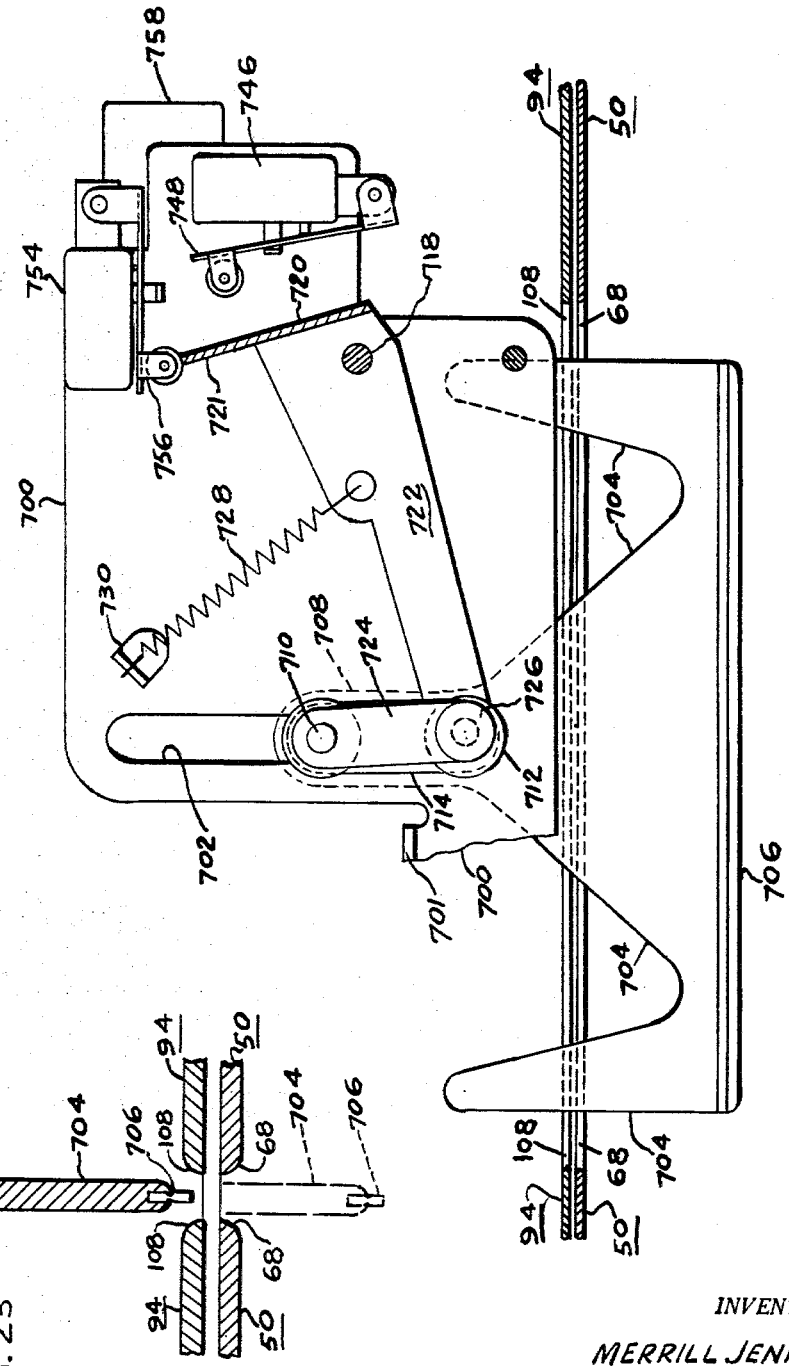
Figure 23:
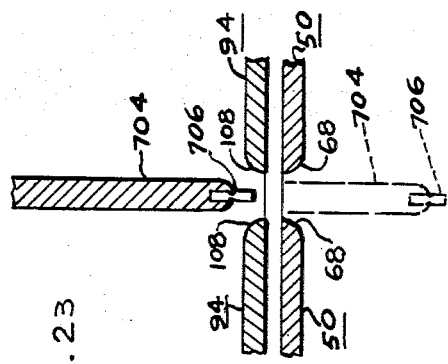
Figure 24:
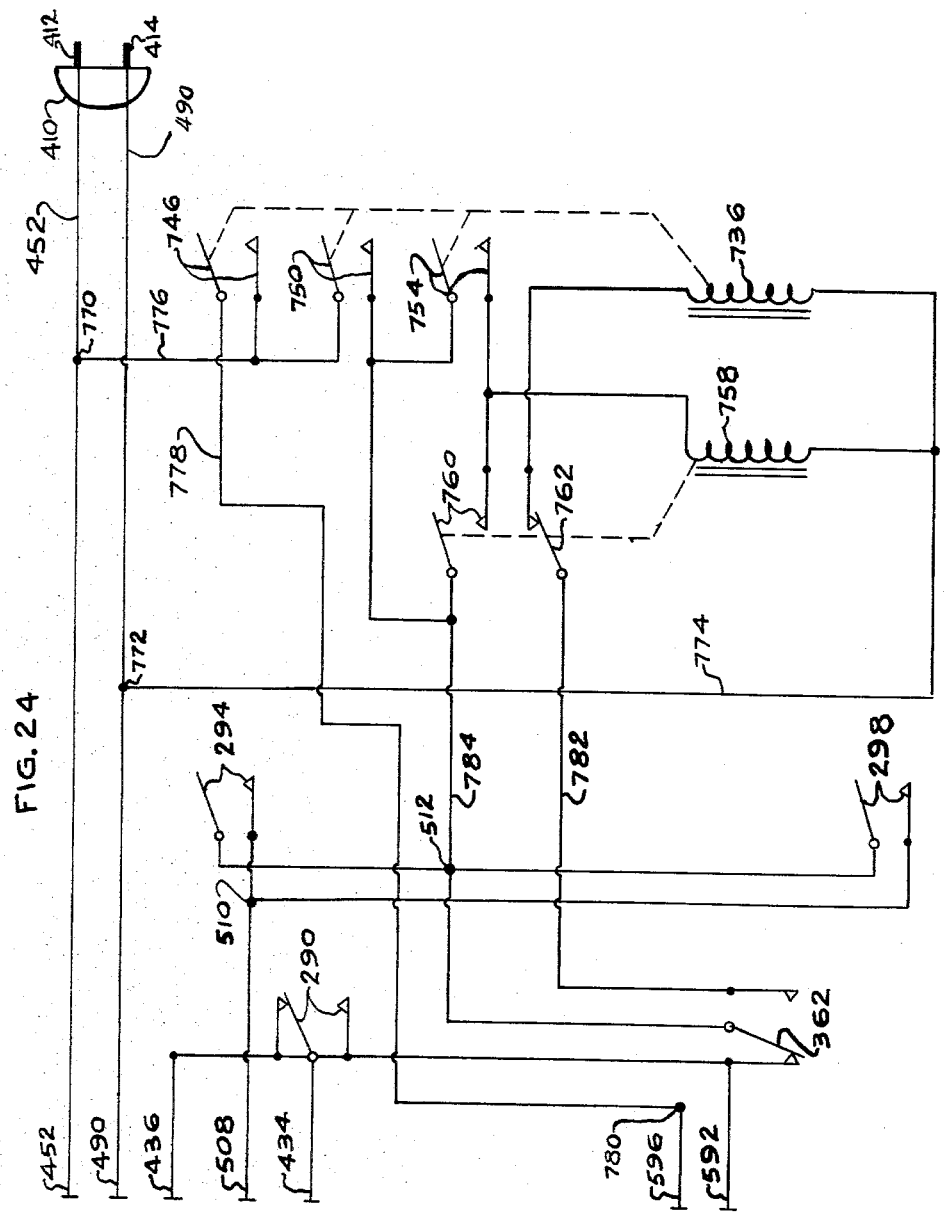

FIG. 18 is a schematic diagram of part of the electrical circuit for the bill-transporting device shown in FIG. 1, FIG. 19 is a schematic diagram of a further part of the electrical circuit for the bill-transporting device shown in FIG. 1, FIG. 20 is a front elevational view of the front plate of the bill-transporting device of FIG. 1 as it appears when the bill-supporting platform is removed, FIG. 21 is a broken, partially sectioned, side elevational view of another embodiment of bill-transporting device that is made in accordance with the principles and teachings of the present invention, FIG. 22 is a sectional view through the embodiment of bill-transporting device shown in FIG. 21, and it shows the bill-discharging element in lowered position, FIG. 23 is a sectional view, on a larger scale, through the embodiment of bill-transporting device shown in FIG. 21, and it is taken along the plane indicated by the line 23—23 in FIG. 21, and FIG. 24 is a schematic diagram of a portion of the circuit used with the embodiment of bill-transporting device shown in FIG. 21.

Referring to the drawing in vertical, the numeral 30 denotes a base for one embodiment of currency identification device that is made in accordance with the principles and teachings of the present invention. That base is generally rectangular in plan, and it has a stiffening flange that extends downwardly from the sides and ends thereof. That has a large opening 31 therein, and that opening begins at a point about one third of the way toward the rear of that base, and that opening extends almost all the way to the rear of that base.

The numeral 32 denotes a vertically directed plate which has a horizontally directed flange at the bottom thereof; and that flange serves as a foot. As indicated particularly by FIG. 2, the foot of the plate 32 is secured to the base 30 adjacent the front edge of that base. A plate 34 of U-shaped configuration is disposed above the plate 32, and that plate lies in the same plane as the lower plate 32. The closed end of the U-shaped plate 34 rests on the top of the plate 32, and the arms of that plate project upwardly from the plate 32. A front plate 36 overlies the front face of the plate 34, and also projects downwardly beyond the bottom of that plate to overlie the front portion of the upper part of the plate 32. A horizontally directed opening 38 is formed in the plate 36, and that opening is wide enough to accommodate a dollar bill when that bill is inserted lengthwise through that opening. Fasteners 40, shown in the form of machine screws, pass through openings adjacent the bottom of the front plate 36 and seat in threaded openings adjacent the upper end of the plate 32.

The numeral 42 denotes the rear plate for the embodiment of currency identification device shown by FIG. 1, and that plate has a horizontally-directed flange which acts as a foot. As indicated particularly by FIG. 2, the flange on the plate 42 is secured to the top of the base 30. The rear plate 42 is parallel to the plate 32, and it is in register with that plate. A U-shaped bracket 44 is suitably secured to the front face of the rear plate 42; and spot welds constitute a convenient way of securing that bracket to that plate. The upper right hand corner of the rear plate 42 is cut away at 43, as shown particularly by FIG. 9.

The numeral 50 generally denotes a horizontally directed platen which is disposed above and which is parallel to the base 30. That platen has a downwardly extending wall portion 52 at the front thereof; and that wall portion has a vertical flange 54 at one side thereof, has a centrally located rectangular opening 58 extending upwardly from the lower edge thereof, and has a vertical flange 62 at the other side thereof. The flanges 54 and 62 act to stiffen the wall portion 52. The platen 50 has a flange 64 which extends downwardly from one of the elongated sides thereof, and that flange is contiguous with the vertical flange 62 and extends almost all the way to the rear edge of that platen. An elongated opening 66 is formed in the platen 50, and that opening is parallel to the flange 64. An elongated slot 68 is formed in the platen 50, and that slot is formed at the longitudinally extending center line of that platen. As indicated particularly by FIG. 8, the slot 68 is shorter than the opening 66. An opening 70 is provided in the platen 50 near the front of that platen; and that opening is in register with the elongated slot 68. That opening is wider than the slot 68, and it is intermediate that slot and the wall portion 52. A second elongated opening 72 is provided in the platen 50; and that opening is parallel to, and has the same length as, the opening 66. The openings 66 and 72 are disposed on opposite sides of the elongated slot 68. A flange 74 is formed at the other elongated side of the platen 50, and that flange extends downwardly to the level of the bottom edge of the flange 64. That flange is contiguous with the vertical flange 54 of the vertical wall portion 52, and it extends almost all the way to the rear edge of the platen 50. The flanges 64 and 74 reinforce and stiffen the platen 50. A rectangular opening 76 is formed adjacent the rear edge of the platen 50, and that opening is intermediate the flange 64 and the elongated opening 66. A similar opening 78 is provided in the platen 50 adjacent the rear edge thereof, and that opening is intermediate the elongated opening 72 and the flange 74. The platen 50 terminates in a downwardly inclined trailing edge 80. A notch 82 is formed in the trailing edge of the platen 50, and that notch extends inwardly beyond the downwardly inclined trailing edge 80 of that platen. Similarly, a notch 84 is formed in the trailing edge of the platen 50, and that notch extends inwardly beyond the downwardly inclined trailing edge 80.

A vertical plate 46, which has a foot-like flange, is secured to the lower face of the platen 50 by that flange. Spot welds can be used to secure that foot-like flange to the lower face of that platen. In addition, the plate 46 has an ear 47, and that ear will be suitably secured to the platen 50. Similarly, a vertical plate 48, which has a foot-like flange, is secured to the lower face of the platen 50 by that foot-like flange. In addition, the plate 48 has an ear 49, and that ear is suitably secured to the platen 50. The ears 47 and 49 are spaced forwardly of the forward ends of the foot-like flanges on the plates 46 and 48, resepectively; and those ears rigidly secure the forward ends of those plates to the platen 50. The foot-like flanges on the plates 46 and 48 are shorter than those plates, as indicated particularly by FIG. 8. The plates 46 and 48 are parallel to each other, and they abut the adjacent edges of the elongated openings 66 and 72. The plates 46 and 48 are shorter than the elongated openings 66 and 72; and those plates terminate short of the notches 82 and 84, respectively.

A short vertical plate 75 has a foot 77; and that foot is secured to the platen 50 by a fastener, such as a machine screw. The plate 75 is alined with the vertical plate 48; but it is spaced a short distance rearwardly of the trailing edge of that plate. The plate 75 extends to the rear edge of the platen 50. A short vertical plate 79 has a foot 81; and that foot is secured to the platen 50 by a fastener, such as a machine screw. The plate 79 is alined with the vertical plate 46; but it is spaced a short distance rearwardly of the trailing edge of that plate. The plate 79 extends to the rear edge of the platen 50. The space defined by the confronting edges of the plates 48 and 75 is in register with the space defined by the confronting edges of the plates 46 and 79.

A securing flange 86 is provided at the front of the plate 46, and a securing flange 88 is provided at the front of the plate 48. As indicated particularly by FIG. 8, those securing flanges are suitably secured to the rear face of the vertical wall portion 52 of the platen 50. The vertical plates 75 and 79 are secured to the U-shaped bracket 44 on the rear plate 42, as by fasteners 90; and since the plates 75 and 79 are fixedly secured to the platen 50, the securement of those plates to the bracket 44 fixedly secures the platen 50 to the rear plate 42. The wall portion 52 at the front of the platen 50 is rigidly secured to the front plate 36 and to the U-shaped plate 34 by suitable fasteners.

The numeral 94 generally denotes a horizontal platen that is substantially identical to the horizontal platen 50. The platen 94 has a wall portion 96 at the front thereof; but instead of extending downwardly from the plane of that platen, that wall portion extends upwardly from that plane. The wall portion 96 has a vertical flange 98 at one side thereof, has a centrally located rectangular opening 100 extending downwardly from the upper edge thereof, and has a vertical flange 102 at the other side thereof. The flanges 98 and 102 act to stiffen the wall portion 96 of platen 94. The platen 94 has a flange 104 which extends upwardly from one of the elongated sides thereof; and that flange is contiguous with the vertical flange 98. The flange 104 extends toward the rear of the platen 94, but it terminates at a point indicated by the numeral 105. An elongated opening 106, identical to the elongated opening 72, is formed in the platen 94; and that opening will be set in register with the elongated opening 66. An elongated slot 108, which is identical to the elongated slot 68 in the platen 50, will be set in register with that elongated slot. An opening 110 is provided in the platen 94; and that opening is identical to, and will be set in register with, the opening 70 in the platen 50. A second elongated opening 112 is formed in the platen 94, and that opening is identical to the opening 66; and that opening will be set in register with the opening 72 in the platen 50. A flange 114 is formed at the other elongated side of the platen 94, and that flange extends upwardly to the lever of the upper edge of the flange 104. That flange is contiguous with the vertical flange 102 on the wall portion 96, and extends almost all the way to the rear edge of the platen 94. The flanges 104 and 114 reinforce and stiffen the platen 94. Openings 116 and 118 are provided in the platen 94 adjacent the rear thereof, and those openings are identical to the openings 76 and 78 in the platen 50. The opening 116 is in register with the opening 76 and the opening 118 is in register with the opening 78. The platen 94 is provided with an upwardly-inclined trailing edge 120; and notches 122 and 124 extend inwardly through that trailing edge and into the horizontally directed portion of the platen 94.

The numeral 126 denotes a vertical plate which has a foot-like flange, and that flange is secured to the upper face of the platen 94. That plate also has an ear and a securing flange, not shown, that are identical to the ear 49 and the securing flange 88 of the vertical plate 48. The numeral 130 denotes a second vertical plate which has a foot-like flange; and that flange also is secured to the upper face of the platen 94. That plate has an ear and a securing flange, not shown, that are identical to the ear 47 and the securing flange 86 of the vertical plate 46. The vertical plates 126 and 130 are disposed in parallel to each other, and they abut the adjacent edges of the elongated openings 106 and 112, respectively, in the platen 94. The vertical plates 126 and 130 are shorter than the elongated openings 106 and 112; and those plates terminate short of the notches 122 and 124, respectively.

A short vertical plate 128 has a foot formed on it; and that foot is secured to the platen 94 by a fastener, such as a machine screw. The plate 128 is alined with the vertical plate 126; but it is spaced a short distance rearwardly of the trailing edge of that plate. The plate 128 extends to the rear edge of the platen 94. A short vertical plate 132 has a foot formed on it; and that foot is secured to the platen 94 by a fastener, such as a machine screw. The plate 132 is aligned with the vertical plate 130; but it is spaced a short distance rearwardly of the trailing edge of that plate. The plate 132 extends to the rear edge of the platen 94. The space defined by the confronting edges of the plates 126 and 128 is in register with the space defined by the confronting edges of the plates 130 and 132.

The securing flanges at the leading edges of the vertical plates 126 and 130 are suitably secured to the rear face of the vertical wall portion 96 of the platen 94. That vertical wall portion is suitably secured to the front plate 36 and to the arms of the U-shaped plate 34 by suitable fasteners; and hence the platen 94 and the vertical plates 126 and 130 thereon are fixedly secured to the front plate 36. Fasteners 135 secure the short vertical plates 128 and 132 to a U-shaped bracket 134 that is spot welded to the front face of the rear plate 42. In this way the platen 94 and the short vertical plates 128 and 132 thereon are fixedly secured to the rear plate 42.

The platens 50 and 94 fixedly and rigidly hold the upper end of the rear plate 42 in spaced relation to the front plate 36. In doing so, they coact with the base 30 to provide a light-weight but rigid frame for the bill-transporting device of FIG. 1. To minimize the flow of magneto-electric currents through that frame, the platens or the front plate or the rear plate or the base should be made of a non-magnetic material.

The rear plate 42 has a generally H-shaped opening 136 therein. However, the cross bar of that opening extends outwardly beyond the vertical portions of that opening, as shown particularly by FIG. 13. That cross bar is dimensioned to accommodate an inserted bill when that bill is moved through that cross bar in a direction which is parallel to the elongated axis of that bill. The cross bar of the H-shaped opening 136 in the rear plate 42 is in direct alignment with the opening 38 in the front plate 36; and that cross bar and the opening 38 are in register with the space intermediate the upper surface of platen 50 and the lower surface of platen 94.

The numeral 138 denotes a guide plate which is mounted intermediate the upper surface of platen 50 and the lower surface of platen 94. That guide plate is as long as the platens 50 and 94, but it is much narrower. Specifically, the guide plate 138 is narrower than that portion of the platen 50 which is intermediate the elongated opening 72 and the flange 74. One of the elongated sides of the guide plate 138 is in register with that side of platen 50 which has the flange 74 thereon; and the other elongated side of that guide plate is spaced from the adjacent edge of the elongated opening 72. An opening 139 is provided in the guide plate 138, and that opening is in register with the openings 78 and 118 in the platens 50 and 94, respectively; all as shown by FIG. 10. A second guide plate 140, which is identical to the guide plate 138, is also disposed intermediate the upper surface of the platen 50 and the lower surface of the platen 94. That guide plate has one of the elongated sides thereof in register with that side of the platen 50 which has the horizontal flange 64 thereon, and that guide plate has the other elongated side thereof spaced from the opening 66. The confronting elongated sides of the guide plates 138 and 140 are spaced apart a distance just slightly greater than the height of a bill. The guide plate 140 has an opening 141 therein, and that opening is in register with the openings 76 and 120 in the platens 50 and 94, respectively; all as shown by FIG. 10.

The space between the confronting edges of the vertical plates 126 and 128 and the space between the confronting edges of the vertical plates 130 and 132 are spanned by a U-shaped plate 146. That U-shaped plate abuts the confronting faces of the plates 126 and 130 and also abuts the faces of the plates 128 and 132; and that U-shaped plate is fixedly secured to those plates by fasteners, such as screws and nuts. That U-shaped plate helps hold the plate 128 in alinement with the plate 126 and helps hold the plate 132 in alinement with the plate 130.

The space between the confronting edges of the plates 48 and 75 and the space between the confronting edges of the plates 46 and 79 are spanned by a heavy-walled gear housing 142; all as shown by FIG. 10. That gear housing abuts the confronting faces of the plates 48 and 46 and also abuts the faces of the plates 75 and 79; and that gear housing is fixedly secured to those plates by fasteners, such as machine screws. That gear housing helps hold the plate 75 in alinement with the plate 48 and helps hold the plate 79 in alinement with the plate 46. The sides of that gear housing have openings 143 therein, and the bottom of that housing has an opening 144 therein.

The numeral 148 denotes a J-shaped bracket which has a frusto-triangular closed end; and the short arm of that bracket is at the widest portion of that closed end. Similar J-shaped brackets are denoted by the numerals 150, 152 and 154. Each of the J-shaped brackets 148, 150, 152 and 154 has horizontal slots 156 in the short arm thereof, and those slots are parallel to the closed ends of those brackets. The long arms of the J-shaped brackets 148, 150, 152 and 154 have vertically directed notches 158 therein, as shown particularly by FIG. 16. The horizontal slots 156 in the short arms of the J-shaped brackets 148 and 150 accommodate the fasteners that secure the U-shaped plate 146 to the plates 126, 128, 130 and 132. The horizontal slots in the short arms of the J-shaped brackets 152 and 154 accommodate the fasteners which secure the gear housing 142 to the plates 46, 48, 75 and 79. The horizontal slots 156 permit limited movement of the J-shaped brackets 148, 150, 152 and 154 relative to the vertical plates 46, 48, 75, 79, 126, 128, 130 and 132 to permit the vertically directed notches 158 of those brackets to be placed in register with the spaces defined by the confronting ends of plates 48 and 75, of plates 46 and 79, of plates 126 and 128, and of plates 130 and 132. The long arms of the J-shaped brackets 148 and 150 extend toward but terminate short of the upper surface of platen 94, and the long arms of the J-shaped brackets 152 and 154 extend toward but terminate short of the lower surface of the platen 50. Suitable bushings 160 are mounted within the notches 158 of the J-shaped brackets 148, 150, 152 and 154; and the bushings 160 in the notches of J-shaped brackets 148 and 150 rotatably support a shaft 162. Timing belt pulleys 164 are fixedly secured to that shaft, and those pulleys will be in register with the elongated openings 106 and 112 in the platen 94. A spur gear 166 is fixedly secured to one end of the shaft 162; and a ratchet-faced clutch member 168 is secured to the shaft 162 intermediate the other end of that shaft and the bushing 160 which supports that other end of that shaft. A ratchet-faced clutch member 170 rotates freely on the shaft 162, and the ratchet-face of that clutch member confronts and can engage the ratchet face of the clutch member 168. A large diameter pulley 172 is mounted on and supported by the shaft 162, adjacent the said other end of that shaft; but that pulley is free to rotate relative to that shaft. A knurled hand wheel 174 is fixedly secured to the said other end of the shaft 162, and that hand wheel can be used to effect rotation of the shaft 162 whenever desired. A helical spring 176 is telescoped over the said other end of the shaft 162, and one end of that spring is seated in a socket in the clutch member 170 while the other end of that spring is seated in a socket in the large diameter pulley 172. That spring is wound in such a way that it will tend to wind tightly if the large diameter pulley 172 is held stationary while the shaft 162 rotates in the counter clockwise direction in FIG. 2.

The numeral 178 denotes a shaft which is held by the bushings 160 that are disposed within the vertical notches 158 of the J-shaped brackets 152 and 154. That shaft is located below the level of, and in vertical registry with, the shaft 162; and that shaft extends through the openings 143 in the gear housing 142. The shaft 178 has timing belt pulleys 180 fixedly secured thereto, and those pulleys are in register with the elongated openings 66 and 72 in the platen 50. A spur gear 182 is mounted on one end of the shaft 178, and that gear meshes with the spur gear 166 on the one end of the shaft 162. A worm wheel 184 is mounted on the shaft 178, and that gear is disposed within the gear housing 142. That worm wheel meshes with, and is driven by, a worm gear 186 which is mounted on the shaft of a motor 188. That motor shaft is vertically directed, and it extends upwardly through the opening 144 in the bottom of the gear housing 142. The motor 188 is suitably secured to, and it depends downwardly from, the gear housing 142. That motor is long enough to extend down into the large opening 31 in the base 30, but it is short enough so it does not extend down below the level of the lower edges of the flanges on that base.

The motor 188 is a reversible motor; and it is preferably a two phase motor. A capacitor 190 is connected in series with the phase winding of motor 188, and that capacitor is mounted on a bracket adjacent the motor 188. That bracket is secured to, and depends downwardly from, the vertical plates 46 and 48. That bracket also supports a multiprong connector 195; and the various electrical components of the bill-transporting device of FIG. 1 are connected to appropriate prongs of that connector.

The numeral 191 denotes a U-shaped bracket which is disposed between the vertical plates 46 and 48 on the platen 50; and the arms of that bracket abut the confronting faces of those plates. As shown by FIG. 3, that bracket is close to the front plate 36; and that bracket supports bushings which accommodate a horizontally directed pivot 192. That pivot has timing belt pulleys 194 rotatably mounted thereon, and those pulleys are in register with the elongated openings 66 and 72 in the platen 50.

The numeral 196 denotes a U-shaped bracket which is disposed between the vertical plates 126 and 130; and that bracket is narrower than the space between those plates. A pivot 198 extends between and is supported by the vertical plates 126 and 130; and that pivot extends through the arms of the U-shaped bracket 196. As a result, that bracket can rotate about that pivot and thus can rotate relative to the plates 126 and 130. A pivot 200 extends between and is secured to the vertical plates 126 and 130 at a point above the top of the bracket 196; and springs 208 are wound around the pivot 198 and have the upper ends thereof bearing against the pivot 200 while having the lower ends thereof bearing against the closed end of the bracket 196. Those springs bias the bracket 196 for rotation in the counter clockwise direction in FIGS. 3 and 4 and thus bias that bracket toward the lowered position shown by FIG. 4. However, those springs can yield to permit the U-shaped bracket 196 to rotate to the raised position shown by FIG. 3.

The bracket 196 carries bushings which support an elongated pivot 202. The ends of that pivot extend through openings in the vertical plates 126 and 130; and those openings are considerably larger than the diameter of the pivot 202. As a result, the U-shaped bracket 196 can rotate a limited number of degrees about the pivot 198 without having the pivot 202 engage the openings in the plates 126 and 130.

The bushings which are carried by the U-shaped bracket 196 also support a U-shaped bracket 206. The latter bracket is narrower than the bracket 196; and hence the bracket 206 can be disposed between the arms of the bracket 196. The bracket 206 rotates about the pivot 202 and thus can rotate relative to the bracket 196; and the bracket 206 can have the right-hand edge of the bottom thereof abutting the closed end of bracket 196, as shown by FIG. 3, or can have that right-hand edge disposed a short distance above that closed end, as shown by FIG. 4. Whenever the bracket 206 has the right-hand edge of the bottom thereof disposed a short distance above the closed end of the bracket 196, the springs 208 will move the bracket 196 to the lowered position shown by FIG. 4. However, when the right-hand edge of the bottom of the bracket 206 is in engagement with the closed end of the bracket 196, and when the bracket 206 is then rotated in the clockwise direction, the bracket 196 will be moved to the raised position shown by FIG. 3. As a result, the bracket 206 can be used to effect raising of the left-hand end of the bracket 196, and thus to effect the raising of the pivot 202. The U-shaped bracket 206 has an upwardly-projecting arm 207 and that arm can be moved to the right in FIG. 4 to rock the brackets 206 and 196 from the positions shown in FIG. 4 to the positions shown by FIG. 3.

Timing belt pulleys 204 are rotatably mounted on the outer ends of the pivot 202; and those pulleys will move up and down as the brackets 206 and 196 raise and lower the pivot 202. The pulleys 204 are mounted in register with the elongated openings 106 and 112 in the platen 94.

The numeral 210 denotes a mounting bracket that is secured to, but is laterally spaced from, the vertical plate 126; and that mounting plate projects upwardly above the top of the plate 126. A horizontally directed pivot 212 is supported by the mounting bracket 210; and a lever 224 is rotatably mounted on that pivot. A connecting rod 214 extends between the upwardly extending arm 207 of the bracket 206 and the lower end of the lever 224; and pin joints 216 and 218 connect that rod with that upwardly projecting arm and with that lever, respectively. The connecting rod 214 extends to the right beyond the lower end of the lever 224, as shown particularly by FIG. 2; and the right-hand end of that rod has an opening in which one end of a helical extension spring 222 is hooked. The other end of that spring is hooked around a pin 220 which is secured to the mounting bracket 210.

The lever 224 has a slot 226 in the upper end thereof, and that slot accommodates a pin which is carried by the plunger 228 of a solenoid 230. That solenoid is suitably secured to and supported by the mounting bracket 210; and that solenoid can be energized to retract the plunger 228 and thereby rotate the lever 224 a distance in the clockwise direction in FIG. 2. A switch 232 is suitably secured to the mounting bracket 210; and the actuator 234 of that switch extends into a hole in the connecting rod 214.

The spring 222 normally holds the connecting rod 214, the lever 224, and the plunger 228 in the positions shown by FIG. 2; and, in doing so, that spring normally holds the bracket 206 in the position shown by FIG. 3. This means that under normal conditions the spring causes the bracket 206 to hold the bracket 196 and the pivot 202 in their raised positions. The force of the spring 222 will be overcome by the solenoid 230 whenever the latter is energized; and hence that solenoid can cause the bracket 206 to rotate to the position shown by FIG. 4. As that bracket so rotates, it will enable the springs 208 to lower the bracket 196 and the pivot 202 to the positions shown by FIG. 4. The energization of the solenoid 230 will also cause the connecting rod 214 to move the actuator 234 far enough to close the contacts of the normally open switch 232.

The numeral 236 denotes a bracket which is secured to, and which spans the space between, the vertical plates 126 and 130. That bracket has downwardly depending legs 238 which are spaced apart; and those legs have slots 240 therein. Those slots accommodate projections 243 on a mounting 242 for a magnetic head 244; and those slots and those projections guide the vertical movement of that mounting. A helical compression spring 246 biases the mounting 242, and thus the magnetic head 244, downwardly relative to the bracket 236; and hence that spring biases that head downwardly relative to the platen 94. However, the spring 246 can yield to permit upward movement of the mounting 242 and of the magnetic head 244. An adjusting screw 248 has the shank thereof passing through a threaded opening in the bracket 236, through the spring 246, and through an openings in the mounting 242. A washer is secured to the lower end of the screw 248; and that washer prevents accidental separation of the mounting 242 from the screw 248. A nut 250 is carried by the adjusting screw 248, and that nut can be used to lock that screw in position relative to the bracket 236. However that nut can be loosened to permit rotation, and thus vertical movement, of the screw 248 relative to the bracket 236. That vertical movement fixes the normal position of the magnetic head 244 relative to the platen 94.

The numeral 252 denotes a socket which can receive a connector that will serve to connect the magnetic head 244 into a suitable circuit. That socket is mounted on the bracket 236, and it is connected to the magnetic head 244 by two short wires. Those wires are readily flexible so that they can permit movement of the magnetic head 244 relative to the platen 94.

The numeral 260 generally denotes a bracket that is L-shaped in configuration, as shown in FIG. 6. That bracket has a long horizontally directed arm and has a short vertically directed arm; and both of those arms have openings therein. The horizontally directed arm also has leading and trailing edges 264 that incline upwardly from the plane of that arm. A hardened face plate 268 is suitably secured to the horizontally directed arm of the bracket 260; and that hardened face plate is strongly resistant to wear. That face plate underlies part of that horizontally directed arm and also underlies the upwardly inclined leading and trailing edges 264. That face plate also has a downwardly depending lip 266; and that lip will confront the innermost edge of one of the timing belts used in the bill-transporting device of FIG. 1.

A number of L-shaped brackets 260 are provided; and the long arms of those brackets are secured to the platens 94 and 50, and the short arms of those brackets are secured to the vertical plates 126, 130, 46 and 48. As indicated particularly by FIG. 1, the brackets 260 which are secured to the platen 94 are grouped in pairs that are spaced along the length of that platen, and the brackets of each pair are set opposite each other. Similarly, the brackets 260 which are secured to the platen 50 are grouped in pairs that are spaced along the length of that platen, and the brackets of each pair are set opposite each other. However, the pairs of brackets 260 which are secured to the platen 94 are displaced from the pairs of brackets 260 which are secured to the platen 50, all as shown by FIG. 5.

The numeral 270 denotes timing belts which extend around and are supported by the timing belt pulleys 204 and 164. The numeral 272 denotes timing belts which extend around and are supported by the timing belt pulleys 194 and 180. The timing belts 270 are mounted so the ribs thereon engage and pass under the hardened face plates 268 of the brackets 260 which are supported by the platen 94. The timing belts 272 are mounted so the ribs thereon engage and pass over the hardened face plates 268 of the brackets 260 which are supported by the platen 50. The hardened face plates 268 of the brackets 260 carried by the platen 50 define a horizontally directed plane, and the hardened face plates 268 of the brackets 260 carried by the platen 94 define a second horizontally defined plane; and the vertical distance between those two planes is less than twice the thickness of any of the timing belts 270 and 272. As a result, the timing belts 270 and 272 must bow downwardly to pass under the hardened face plates 268 of the brackets 260 secured to the platen 94 and must bow upwardly to pass over the hardened face plates 268 of the brackets 260 secured to the platen 50. The downward and upward bowing of the timing belts will alternate and will force those belts to undulate as they move relative to the platens 50 and 94. This undulation is very desirable because it recurrently forces the confronting faces of the timing belts 270 and 272 into intimate engagement with a bill interposed between those faces. If desired, rollers could be used instead of the brackets 260. However, while rollers would reduce the frictional forces applied to the timing belts 270 and 272, those forces have not been found to be particularly objectionable.

The timing belts 270 and 272 will be driven by the timing belt pulleys 164 and 180 mounted on the shafts 162 and 178, respectively. The shaft 178 will be directly driven by the motor 188, and the spur gears 182 and 166 will enable that shaft to drive the shaft 162. The gears 182 and 166 are important in keeping the belts 270 and 272 moving in synchrony with each other.

The numeral 274 denotes a switch that has an arcuate actuator 276. That switch is secured to the platen 50 adjacent the front of that platen, and the actuator of that switch extends upwardly into the openings 72 and 112. In doing so, that actuator extends into the path of movement of any bill that is inserted within the bill-transporting device of FIG. 1. The actuator 276 is immediately adjacent the belts 272 and 270 which are disposed within the openings 72 and 112, and hence the portion of the leading edge of the inserted bill which engages that actuator will be fully and completely supported by those belts. As a result, that portion of that leading edge will be able to resist any tendency to crumple or roll up as it engages and moves the actuator 276. The actuator 276 extends toward the wall portions 52 and 96, respectively, of the platens 50 and 94; and, consequently, that actuator will be engaged and moved by an inserted bill almost as soon as the leading edge of that bill passes inwardly beyond those wall portions.

The numeral 278 denotes a switch that has an arcuate actuator 280. That switch is secured to the platen 94 adjacent the front of that platen; and the actuator of that switch extends downwardly into the openings 106 and 66. In doing so, that actuator extends into the path of movement of any bill that is inserted within the bill-transporting device of FIG. 1. The actuator 280 is immediately adjacent the belts 270 and 272 which are disposed within the openings 106 and 66; and hence the portion of the leading edge of the inserted bill which engages that actuator will be fully and completely supported by those belts. The actuator 280 extends toward the wall portions 52 and 96 of the platens 50 and 94 and will thus be engaged by an inserted bill almost as soon as the leading edge of that bill passes inwardly beyond those wall portions. The actuator 276 of the switch 274 and the actuator 280 of the switch 278 will be engaged by an inserted bill at about the same time where that inserted bill is intact and the corners thereof are not folded. However, if a corner of the inserted bill has been torn off or has been folded, one of those actuators will be engaged and moved before the other actuator is engaged and moved. To make certain that the presence of an inserted bill is sensed promptly, the switches 274 and 278 are connected in parallel, as shown by FIG. 18. This means that a closed circuit will be established almost as soon as the inserted bill passes inwardly beyond the wall portions 52 and 94, respectively, of the platens 50 and 94; and that closed circuit will be established by one or the other or both of switches 274 and 278.

The numeral 282 denotes a switch has an arcuate actuator 284. That switch is secured to the platen 50 about one-quarter of the distance toward the rear of that platen, and the actuator 284 extends upwardly into the openings 106 and 66. That actuator is immediately adjacent the belts 270 and 272 which are disposed within those openings, and those belts will give full and complete support to the leading edge of any inserted bill. The actuator 284 extends rearwardly; and that actuator is thus, in part at least, disposed rearwardly of the actuator 280.

The numeral 286 denotes a switch that has an arcuate actuator 288. That switch is secured to the platen 50 at a point about one half of the distance toward the rear of that platen, and the actuator 288 extends upwardly into the openings 112 and 72. That actuator is immediately adjacent the belts 270 and 272 which are disposed within those openings, and those belts will give full and complete support to the leading edge of any inserted bill. The actuator 288 extends forwardly toward the front plate 36;

and an inserted bill will engage that actuator while that bill is still engaging and holding the actuators 276 and 280 of the switches 274 and 278.

The numeral 290 denotes a switch that has an arcuate actuator 292. That switch is secured to the platen 50 at a point which is just a little further toward the rear of that platen than is the point at which the switch 286 is secured to that platen. The actuator 292 extends upwardly into the openings 106 and 66, and it extends rearwardly from that switch. That actuator is immediately adjacent the belts 270 and 272 which are disposed within the openings 106 and 66, and those belts will give full and complete support to the leading edge of any inserted bill.

The numeral 294 denotes a switch that has an arcuate actuator 296. That switch is secured to the platen 50 adjacent the rear of that platen, and the actuator of that switch extends into the openings 106 and 66. The actuator 296 extends rearwardly toward the rear of the platen 50, and it extends between the shafts 162 and 178. That actuator is immediately adjacent the belts 270 and 272 which are disposed within the openings 106 and 66, and those belts will give full and complete support to the leading edge of any inserted bill.

The numeral 298 denotes a switch that has an arcuate actuator 300. That switch is secured to the platen 94 adjacent the rear of that platen, and the actuator of that switch extends into the openings 112 and 72. The actuator 300 extends rearwardly toward the rear of the platen 94, and it extends between the shafts 162 and 178. That actuator is immediately adjacent the belts 270 and 272 which are disposed within the openings 112 and 72, and those belts will give full and complete support to the leading edge of any inserted bill.

The actuators 296 and 300 are opposite each other, and they will be engaged by the leading edge of an inserted bill at about the same time. Further, those actuators extend as close to the rear edges of the platens 50 and 94 as is practicable; and hence an inserted bill will hold those actuators in moved position until that bill has passed almost all the way through the opening 136 in the rear plate 42. The switches 294 and 298 are connected in parallel, as shown by FIG. 18; and hence they can sense an inserted bill that has a corner which has been torn off or folded.

The arcuate actuators 276, 280, 284, 288, 292, 296 and 300 are bent to have large radii of curvature. Such large radii are desirable for two reasons: first, they enable those actuators to simulate shallow inclined planes and thus enable those actuators to move easily when they are engaged by the leading edge of an inserted bill; and second, they enable each of those actuators to maintain contact with the inserted bill throughout an appreciable portion of the path of movement of that bill.

Stops 302 are provided for some of the switch actuators, and those stops will be secured to the vertical plates 46, 48, 126 and 130 by machine screws or other suitable fasteners. Those stops will limit the extent to which these actuators project through the openings 66, 72, 106 and 112. Those stops have slots 304 therein, and those slots permit adjustments in the positions of those stops relative to the vertical plates 66, 72, 106 and 112. As a result, those stops facilitate the making of adjustments in the normal positions of the switch actuators.

The numeral 306 denotes a bearing bracket which is secured to the platen 94 adjacent the rear of that platen. That bracket is intermediate the opening 118 and the upwardly inclined trailing edge 120 of that platen. That bearing bracket suitably supports a bushing 310 which accommodates and rotatably supports one end of a shaft 308. A bushing 312 is carried by the vertical plate 128, and that bushing rotatably supports the other end of the shaft 308. That shaft has soft-faced rollers 314 fixedly secured thereto, and those rollers rotate with that shaft. The soft-faced rollers are immediately adjacent the outer faces of the vertical plates 126 and 130; and parts of those rollers extend into the opening 136. A small diameter pulley 316 is fixedly secured to and rotatable with the shaft 308, and that pulley is in alinement with the large diameter pulley 172 that is loosely mounted on and carried by the shaft 162. An endless belt 318 extends around and is supported by the large diameter pulley 172 and by the small diameter pulley 316.

The vertical plates 75 and 79 support bushings 317, and those bushings rotatably support a shaft 319. That shaft is located below the level of, and is in vertical registry with, the shaft 308. Soft-faced rollers 321 are secured to and rotatable with the shaft 319; and those rollers engage and are driven by the soft-faced rollers 314 which rotate with the shaft 308. The diameters of the soft-faced rollers 314 and 321 are so large that the confronting faces of those rollers always abut and slightly deform each other.

The numeral 320 denotes a U-shaped bracket which is disposed between, and is secured to, the plates 46 and 48; and that bracket is disposed adjacent the front ends of those plates. A pivot 322 is supported by that bracket, and a carrier 323 is rotatably mounted on that pivot. That carrier is generally U-shaped; and that carrier supports a pivot 324. A soft-faced roller 326 is rotatably mounted on that pivot, and that soft-faced roller can be moved toward and away from the bottom face of the magnetic head 244 by appropriate rotation of the carrier 323.

A pin joint 328 is provided at the bottom of the carrier 323, and that pin joint is connected to one end of a connecting rod 334. The other end of that connecting rod is secured to the plunger 332 of a solenoid 330. That solenoid is fixedly secured to a small plate 331 which, in turn, is fixedly secured to the vertical plate 48; and the plate 331 extends downwardly from the plate 48.

The numeral 336 denotes a horizontal platform which projects outwardly from the front face 36 of the currency identification device, and that platform serves to support a bill which is to be tested by that device. A bracket 338 of attractive appearance surrounds and helps support the platform 336; and the upper edges of that bracket project upwardly beyond the upper face of that platform. Those edges help a patron aline a bill with the opening 38 in the front plate 36, and they also make certain that the patron will move the leading edge of that bill far enough through that opening to be intermediate the leading edges of the belts 270 and 272.

The numeral 342 denotes a bar which is secured to and which extends upwardly from the upstanding wall portion 96 of the platen 94. That bar has an opening in the top thereof, and that opening accommodates a push button 340. That push button will be mounted so patrons can have easy access to it.

The numeral 370 denotes a gate which is generally flat but which has a horizontally directed ear 372 adjacent the top thereof. That gate is thinner than the U-shaped plate 34, and that gate is narrower than the horizontal distance between the upstanding arms of that plate. As a result, that gate can fit within the space defined by the arms by and the closed end of the U-shaped plate 34. The wall portion 96 of the platen 94 overlies part of the rear face of that gate but does not obstruct movement of that gate; and the front plate 36 overlies substantially all of the front face of that gate but does not obstruct movement of that gate. As a result, the gate 370 is held in a vertical position by, but is free to move vertically relative to, the front plate 36 and the wall portion 96 of the platen 94.

The gate 370 has an opening 374 therein, and that opening is made wide enough to accommodate a bill when that bill has its long axis perpendicular to the plane of that gate. That opening will normally be set in register with the opening 38 in the front plate 36, as shown by FIG. 14; but that opening can be moved downwardly out of register with the opening 38, as shown by FIG. 15. A switch 362 is mounted on the platen 94 adjacent the front of that platen, and the actuator 364 of that switch extends to, and is hooked through, an opening in the ear 372 on the gate 370. Whenever the gate 370 is in the raised position shown by FIG. 14, the movable contact of that switch will engage the left-hand fixed contact of that switch, as shown by FIG. 18; but whenever that gate is in the lowered position shown by FIG. 15, that movable contact will engage the right-hand fixed contact of that switch.

A solenoid 344 is supported on and carried by the mounting bracket 210; and, as shown by FIG. 1, that solenoid is at one face of that bracket while the switch 232 is at the other face of that bracket. The plunger 346 of the solenoid 344 is disposed adjacent the upper end of a rocker arm 350 which is rotatably supported by a pivot 348 that is carried by the mounting bracket 210. The upper end of that rocker arm is rotatably secured to the plunger 346 by a pin joint 349; and the lower end of that rocker arm is secured to one end of a connecting rod 352 by a pin joint 351.

The other end of that connecting rod is connected to an ear on a bracket 354 by means of a pin joint 355. That bracket is rotatably mounted on the pivot 200 which is held by the vertical plates 126 and 130; and that bracket has an extension 353 which underlies the ear 372 on the gate 370. A helical extension spring 356 has one end thereof hooked through an opening in the bottom of the rocker arm 350 and has the other end thereof hooked around a pin 357 that is secured to the mounting bracket 210. The spring 356 urges the rocker arm 350 for rotation in the counter clockwise direction, and also urges the connecting rod 352 for movement to the right, in FIG. 2. Such movement of that connecting rod will rotate the U-shaped bracket 354 to the dotted-line, raised position of FIG. 15. However, that spring can yield to permit that bracket to move to the solid-line, lowered position in FIG. 15. When the bracket 354 is in its raised position it will hold the ear 372 of the gate 370 up against the adjustable stop 360, shown in the form of a machine screw. That stop is suitably held by a bracket 361 which is secured to and supported by the vertical plate 130. A nut 363 can be tightened against the bracket 361 to prevent rotation of the stop 360, and thus prevent accidental shifting of the vertical position of that stop. When the bracket 354 is in its lowered position, the gate 370 will be free to move downwardly and sense for the presence or absence of a thread, tape or other member attached to the inserted bill.

The numeral 426 in FIG. 19 denotes a unit which includes a tuned amplifier and a control element; and that unit can be identical to the similarly numbered unit disclosed in copending Smith et al. application Serial No. 849,066 for Currency Detectors which was filed on October 27, 1959, now abandoned. The numeral 428 denotes the coil of a relay that has contacts 438, 439 and 440, the numeral 446 denotes the coil of a relay that has contacts 442 and 444, the numeral 462 denotes the coil of a relay that has contacts 454, 456, 458 and 460, and the numeral 476 denotes the coil of a relay that has contacts 470, 472 and 474. Those relays are part of a relay chain which is similar to a relay chain, in the said copending Smith et al. application, that has similarly numbered relays. The numeral 520 denotes the coil of a relay that has contacts 522, 524 and 526, the numeral 528 denotes the coil of a relay that has contacts 530, 532 and 534, the numeral 544 denotes the coil of a relay that has contacts 550, 552, 554, 556, 558, 560, 562, 564 and 566, and the numeral 578 denotes the coil of a relay that has contacts 584, 586 and 588. The parts of the circuit shown in FIGS. 18 and 19 are interconnected by the conductors 452, 490, 436, 434, 429, 594, 496, 500, 498, 604, 596, 592 and 602. Those parts of the circuit can be connected to a suitable source of A.C. voltage by the plug 410 which has prongs 412 and 414.

Whenever the bill-transporting device shown in FIG. 1 is at rest, the spring 222 will pull the connecting rod 214 to the right, as shown by FIG. 3, and will thus cause the U-shaped bracket 206 to rotate the U-shaped bracket 196 to its raised position. As a result, whenever the bill-transporting device of FIG. 1 is at rest, the pivot 202 and the timing belt pulleys 204 thereon will be in raised position. This means that the leading edges of the timing belts 270 will be above, and out of engagement with, the leading edges of the timing belts 272; and this is desirable because it facilitates the ready introduction of a bill between those leading edges.

At this time, the spring 356 will pull the rocker arm 350 in the counterclockwise direction, and will thus pull the connecting rod 352 to the position shown by FIG. 2. That connecting rod will hold the U-shaped bracket 354 in the raised position shown by dotted lines in FIG. 15, and will thus hold the gate 370 in the raised position shown by dotted lines in FIG. 15. This means that the opening 374 in that gate will be alined with the opening 38 in the front plate 36 and will also be alined with the space between platens 50 and 94. As a result, a patron can easily introduce the leading edge of a bill through the openings 38 and 374 and into the space between the platens 50 and 94.

Also at this time, a spring within the solenoid 330 holds the plunger 332 of that solenoid in the extended position shown by FIG. 2. That plunger will act through the connecting rod 334 and through the carrier 323 to hold the soft-faced roller 326 below and out of engagement with the magnetic head 244. However, whenever that solenoid is energized, its plunger 332 will be retracted and will act through the connecting rod 334 and the carrier 323 to force the soft-faced roller 326 upwardly toward the magnetic head. That soft-faced roller is readily deformable by the forces exerted by the solenoid 330; and, as a result, that roller will force an inserted bill up against the face of the magnetic head 244 and will then deform itself to assume a concave configuration at the upper face thereof. This assumption of a concave configuration is desirable because it will bow the inserted bill around the face of the magnetic head; and that bowing action is important in assuring full registration of the bill with the air gap of that magnetic head, and in tending to smooth out wrinkles in the bill. The soft-faced roller 326 can rotate readily relative to the pivot 324, and that ready rotation will minimize the frictional drag which is applied to the inserted bill during the sensing of that bill.

Whenever the currency detector provided by the present invention is at rest, the electrical components of that currency detector will be in the positions shown by FIGS. 18 and 19. At such time, the terminal 412 of the plug 410 will be directly connected to the fixed contacts of the normally-open switches 274, 278 and 286 by conductors 452 and 450, to the movable contacts of the normally open contacts 470 and 472 adjacent relay coil 476 by conductor 452 and junction 598, to the movable contact of the normally open contacts 586 adjacent the relay coil 578 by conductor 452 and junction 598 and conductor 480 and junction 481, and to the movable contact of the normally closed contacts 524 adjacent the relay coil 520 by the conductor 452, the junction 598, the conductor 480, the junction 481 and the conductor 432. The terminal 412 will be connected to the movable contact of the switch 290 by the conductor 452 and junction 598 and conductor 480 and junction 481 and conductor 432 and the normally closed contacts 524 adjacent the relay coil 520 and conductor 434; and that terminal will be connected to one of the fixed contacts of the push button 340 by the movable and upper fixed contacts of the switch 290 and by conductor 436. In addition, that terminal will be connected to the fixed contact 530 adjacent the relay coil 528 by conductor 452, junction 598, conductor 480, junction 481, conductor 432, contacts 524, conductor 434, the movable and upper fixed contacts of the switch 290 and conductor 436. The other fixed contact of the push button 340 will be connected to the terminal 414 of the plug 410 by conductor 594, rectifier 540, serially connected resistor 538 and relay coil 528, junctions 542, 572, 582 and 590, and conductor 490.

At this time, a patron can readily insert the leading edge of a bill 400 between the leading edges of the upper and lower timing belts 270 and 272. The upstanding sides and end of the bracket 338 will help the patron effect proper placement of that bill. The patron will then press the push button 340, thereby energizing the relay coil 528 via conductor 452, junction 598, conductor 480, junction 481, conductor 432, contacts 524, conductor 434, the movable and upper fixed contacts of switch 290, conductor 436, push button 340, conductor 594, rectifier 540, serially connected resistor 538 and relay coil 528, junctions 542, 572, 582 and 590 and conductor 490. As current flows through the serially connected resistor 538 and relay coil 528, the condenser 536 will become charged. The current will continue to flow through the serially connected resistor 538 and relay coil 528 as long as the patron holds the push button 340 closed; and after the patron releases that push button, the condenser 536 will discharge through the serially connected resistor 538 and relay coil 528 to keep that coil energized for a predetermined period of time. The duration of that period of time will be determined by the values of the resistor 538 and of the condenser 536; and that period of time will preferably be less than one second. The overall result is that the relay coil 528 will be energized and will be kept energized for a short, but adequate, period of time.

The energization of the relay coil 528 will enable that coil to shift the movable contact 532 down into engagement with the fixed contact 530. That shifting will energize the solenoid 230 via conductor 542, junction 598, conductor 480, junction 481, conductor 432, normally closed contacts 524, conductor 434, the movable and upper fixed contacts of switch 290, conductor 436, contacts 530 and 532, junctions 570 and 600, conductor 429, junctions 482 and 484, solenoid 230, junction 486, conductor 488, and conductor 490. Thereupon the solenoid 230 will retract its plunger 228 and rotate the rocker arm 224 in the clockwise direction in FIG. 3, thereby shifting the connecting rod 214 toward the front plate 36. Such shifting of the connecting rod 214 will permit the upwardly extending arm 207 of the bracket 206 to move forwardly and release the holding force which is normally applies to the U-shaped bracket 196. At this time, the springs 208 will act upon the U-shaped bracket 196 and rotate that bracket in the counter clockwise direction about the pivot 198; and this means that the pivot 202 with its timing belt pulleys 204 will be forced to move downwardly. Those pulleys will cause the leading edges of the upper timing belts 270 to press the leading edge of the inserted bill into intimate engagement with the lower timing belts 272.

As the connecting rod 214 shifted forwardly toward the front plate 36, that rod moved the switch actuator 234 for enough in the clockwise direction in FIG. 3 to close the normally open switch 232. The closing of that switch completes a circuit through the phase winding of the motor 188 via conductor 452, junction 598, conductor 480, junction 481, conductor 432, contacts 524, conductor 434, the movable and upper fixed contacts of switch 290, conductor 436, contacts 530 and 532, junctions 570 and 600, conductor 429, junctions 482 and 484, switch 232, capacitor 190, the phase winding of the motor 188, junctions 492, 494 and 486, and conductors 488 and 490. The closing of the switch 232 also completes a circuit through the main winding of the motor 188 via conductor 452, junction 598, conductor 480, junction 481, conductor 432, contacts 524, conductor 434, the movable and upper fixed contacts of the switch 290, conductor 436, contacts 530 and 532, junctions 570 and 600, conductor 429, junctions 482 and 484, switch 232, conductor 496, contacts 558 and 560, junction 576, conductor 498, the main winding of the motor 188, conductor 500, contacts 554 and 552, junctions 574, 572, 582 and 590, and conductor 490. As a result, the motor 188 will start rotating in such a direction as to cause the timing belts 270 and 272 to start moving the inserted bill 400 toward the rear of the bill-transporting device.

It will be noted that the initial connection of the solenoid 230 and of the motor 188 to the terminal 412 of the plug 410 is through the relay contacts 530 and 532; and this means that a further connection must be established because the time constant of condenser 536 and resistor 538 is less than one second and hence the contacts 530 and 532 can separate in less than a second. The bill-actuated switches 274 and 278 provide that further connection for the solenoid 230 and the motor 188 when the timing belts 270 and 272 move the leading edges of the inserted bill 400 into engagement with the actuators 276 and 280 of those switches. The time constant of the condenser 536 and resistor 538 is short enough to keep any idle pressing of the push button 340 by passersby from causing the solenoid 230 to hold the leading edges of the timing belts 270 and 272 in engagement with each other indefinitely, and from causing the motor 188 to run indefinitely. However, that time constant is long enough to keep the solenoid 230 and the motor 188 energized until after the bill 400 has actuated the switches 274 and 278.

As the inserted bill 400 causes the actuators 276 and 280 to close the switches 274 and 278, a circuit will be established via conductors 452 and 450, switches 274 and 278, conductor 502, conductor 429, junctions 482 and 484, solenoid 230, junction 486, and conductors 488 and 490. Those switches will also complete a second circuit via conductors 452 and 450, switches 274 and 278, conductor 502, conductor 429, junctions 482 and 484, switch 232, capacitor 190, the phase winding of the motor 188, junctions 492, 494 and 486, and conductors 488 and 490. Those switches also complete a third circuit via conductors 452 and 450, switches 274 and 278, conductor 502, conductor 429, junctions 482 and 484, switch 232, conductor 496, contacts 558 and 560, junction 576, conductor 498, the main winding of the motor 188, conductor 500, contacts 554 and 552, junctions 574, 572, 582 and 590, and conductor 490. The overall result is that the bill-actuated switches 274 and 278 keep the solenoid 230 and the motor 188 energized; and those switches will keep that solenoid energized as long as either of them remains closed. Further, those switches will keep the motor 188 energized as long as the contacts 558 and 560 and the contacts 554 and 552 remain closed and either of the switches 274 and 278 remains closed. Consequently, although the relay coil 528 will become de-energized within a second after the push button 340 is released, the solenoid 230 and the motor 188 will continue to remain energized.

The timing belts 270 and 272 will continue to move the inserted bill 400 toward the rear of the bill-transporting device; and the leading edge of that bill will soon engage and move the actuator 284 of the switch 282 and thereby close that switch. Thereupon a circuit will be completed via conductors 452 and 450, switches 274 and 278, conductor 502, conductor 429, junctions 600 and 570, contacts 564 and 566, junction 568, conductor 604, switch 282, solenoid 330, junctions 494 and 486, and conductors 488 and 490. The resulting energization of the solenoid 330 will retract the plunger 332 and pull the connecting rod 334 toward the rear of the bill-transporting device, thereby rotating the carrier 323 in the counter clockwise direction in FIG. 2. That rotation causes the soft-faced roller 326 to engage the lower face of the inserted bill 400 and to press the upper face of that bill against the convex face of the magnetic head 244. The plunger 332 will fully seat itself, and it will thereby minimize the number of stray magnetic flux lines generated by the solenoid 330. As that plunger fully seats itself, it will apply such a strong upwardly directed force to the roller 326 that the uppermost portion of the face of that roller will not only deform to conform to the convex curvature of the face of the magnetic head 244 but will also force that magnetic head to move upwardly. The spring 246 will yield to permit the mounting 242 for the magnetic head 244 to move upwardly and thereby permit the magnetic head to move upwardly. That spring will, however, exert a downwardly directed force on the magnetic head 244 which is strong enough to urge the face of that magnetic head into intimate engagement with the inserted bill 400 and to keep the uppermost portion of the face of the roller 326 deformed.

The actuator 284 for the switch 282 is set far enough away from the front plate 36 to enable the leading edge of the bill 400 to pass between the magnetic head 244 and the soft-faced roller 326 before that leading edge moves the actuator 284. As a result, the magnetic head 244 and the roller 326 can not cause the leading edge of the bill 400 to crumple or roll up. However, the actuator 284 is set close enough to the front plate 36 to enable the leading edge of the bill 400 to move that actuator before the portrait background of that bill reaches the magnetic head 244. As a result, the magnetic head 244 will engage and sense the portrait background of the bill 400.

By the time the inserted bill 400 is moved into engagement with the actuator 284 of switch 282, that bill will have been raised to the desired synchronous speed; and the engagement of the roller 326 with that bill and the engagement of that bill with the magnetic head 244 will not keep that bill from continuing to move at synchronous speed. The continued movement of the inserted bill 400 past the magnetic head 244 will cause voltage variations to be generated in the coil of that magnetic head, all as disclosed in the said copending Smith et al. application. Those voltage variations will be suitably amplified by a tuned amplifier in the unit 426 of FIG. 19 and will cause the control element in that unit to produce two validating signals, all as disclosed in the said copending Smith et al. application.

The first of those two validating signals will energize the relay coil 428; and thereupon contact 439 will engage contact 440. At such time a circuit will be completed via conductors 452 and 450, switches 274 and 278, conductor 502, conductor 429, junctions 600 and 430, contacts 439 and 440, contacts 456 and 454, junction 448, relay coil 446, junctions 466, 480 and 590, and conductor 490. Relay contacts 442 and 444 will close; and the contacts 444 will establish a holding circuit for the coil 446.

As that first validating signal passes, the relay coil 428 will become deenergized and the contact 439 will move back up into engagement with the contact 438; and such engagement will complete a circuit via conductors 452 and 450, switches 274 and 278, conductor 502, conductor 429, junctions 600 and 430, contacts 439 and 438, now closed contacts 442, junction 464, relay coil 462, junctions 466, 480 and 590, and conductor 490. Contacts 460 will then close to establish a holding circuit for coil 462; and the contact 456 will move down into engagement with the contact 458. Such movement will break the connection between the contact 456 and the relay coil 446; but the breaking of that connection can not deenergize that relay coil because of the holding circuit established by the contacts 444.

The second validating signal will again energize the relay coil 428; and the resulting downward movement of the contact 439 will complete a circuit via conductors 452 and 450, switches 274 and 278, conductor 502, conductor 429, junctions 600 and 430, contacts 439 and 438, contacts 456 and 458, relay coil 476, junctions 480 and 590, and conductor 490. Relay contacts 470, 472 and 474 will then close; and the contacts 474 will complete a holding circuit for the coil 476. The closing of the contacts 470 will connect the terminal 412 of the plug 410 to the conductor 504 which, in turn, can be connected to a suitable terminal in the vending machine, change maker or other device to be controlled by the currency detector. The closing of the contacts 472 completes a circuit via conductor 452, junctions 598 and 468, contacts 472, conductor 506, relay coil 520, junctions 542, 572, 582 and 590, and conductor 490. The passing of the second validating signal will again deenergize the relay coil 428 and thus disconnect the contact 439 from the relay coil 476, but that coil will be kept energized by the holding circuit through contacts 474.

The energization of relay coil 520 will open contacts 522 and 524 and will close contacts 526. The opening of contacts 522 prevents the energization, at this time, of the relay coil 544; and the opening of the contacts 524 disconnects the terminal 412 from the push button 340 and from the contact 530. The closing of the contacts 526 completes a circuit via conductor 452, conductor 450, switches 274 and 278, conductor 502, conductor 429, junctions 600 and 570, contacts 564 and 566, junction 568, conductor 604, contacts 526, conductor 602, solenoid 344, junctions 492, 494 and 486, and conductors 488 and 490. The resulting energization of the solenoid 344 will retract the plunger 346 and thereby shift the connecting rod 352 toward the front plate 36. That shifting will rotate the bracket 354 forwardly and downwardly; and the extension 353 thereof will move downwardly and release the gate 370. If no thread, tape or other member is attached to the bill 400, the gate 370 will be able to move down far enough to permit switch 362 to shift its movable contact. At this time, the trailing edge of the inserted bill 400 will have passed inwardly through the opening 374; and the gate 370 will then move downwardly to block the opening 38 in the front plate 36. In doing so, that gate will protect the patron from the loss of a further inserted bill. The gate 370 will remain in its lowered position, and the switch 362 will remain in its shifted position as long as the solenoid 344 remains energized.

The bill 400 will continue to move rearwardly of the bill-transporting device; and its leading edge will engage and move the actuator of the switch 286. That switch is connected in parallel with the switches 274 and 278; and hence the closing of that switch will merely help maintain the circuits which were being maintained by the switches 274 and 278.

Further rearward movement of the inserted bill 400 will cause the leading edge of that bill to engage the actuator 292 of switch 290 and thereby move the movable contact of that switch into engagement with the lower fixed contact. Because the relay coil 520 was energized previously and is still energized, the movement of that movable contact will not produce any immediate change in the position of any other electrical component of the currency detector.

Continued rearward movement of the bill 400 will cause that bill to engage the actuators 296 and 300 of the switches 294 and 298. Thereupon, a circuit will be completed via conductors 452 and 450, switches 274, 278 and 286, conductors 502 and 429, junction 482, conductor 508, junction 510, switches 294 and 298, junction 512, the movable and right-hand fixed contacts of switch 362, conductor 596, relay coil 578, junctions 582 and 590, and conductor 490. The resulting energization of relay coil 578 will close the contacts 584, 586 and 588. The closing of the contacts 584 will interconnect conductors 514 and 516; and those conductors can be suitably connected to terminals in the vending machine, change maker or other device controlled by the currency detector. The closing of the contacts 588 interconnects the conductors 518 and 519; and those conductors will be connected to suitable terminals in the vending machine, change maker or other device controlled by the currency detector. The closing of the contacts 586 will connect the conductor 429 to the terminal 412 via conductor 452, junction 598, conductor 480, junction 481, conductor 580, contacts 586, and junction 600. This is desirable because it enables the switches 294 and 298 to maintain the circuits which were maintained by the switches 274, 278 and 286.

The bill 400 will continue to move toward the rear of the bill-transporting device, and as that bill does so, its leading edge will pass between the small diameter rollers 314 and 321. Those rollers normally rotate at an angular rate which is greater than the angular rate at which the pulley 172 rotates. As long as the inserted bill 400 is held by the timing belts 270 and 272, it will be unable to move at a speed which is equal to the normal, high peripheral speed of the rollers 314 and 321. Further, as long as the inserted bill 400 engages the timing belts 270 and 272 as well as the small diameter rollers 314 and 321, those rollers will be held to a lower-than-normal peripheral speed. This means that the pulley 316 will not be able to rotate at its normal angular rate; and the overall result is that the helical torsion spring 176 will tend to wind itself tighter, thereby storing energy within itself. As soon as the trailing edges of the inserted bill 400 passes beyond the trailing edges of the timing belts 270 and 272, the helical torsion spring 176 will restore itself to its normal condition. As it does so, that spring will rapidly rotate the small diameter rollers 314 and 321 in the same direction in which they had been rotating; and that rapid rotation will give an added impetus to the movement of the bill 400 toward the cash box, not shown, which will be set adjacent the opening 136 in the rear plate 42.

As the inserted bill 400 successively moves out of engagement with the actuators 276, 280 and 288 of the switches 274, 278 and 286, the movable contacts of those switches will return to the positions shown by FIG. 18. However, the switches 294 and 298 will maintain the circuits previously maintained by the switches 274, 278 and 286. This means that the switches 294 and 298 will keep the solenoid 230, the solenoid 330, the solenoid 344, the motor 188, and the relay coils 446, 462 and 476 energized until the trailing edge of the bill 400 has passed rearwardly beyond the trailing edges of the timing belts 270 and 272.

As the trailing edge of the bill 400 moves out of engagement with the actuators 296 and 300 of the switches 294 and 298, those switches will break the connection to the relay coil 578. In addition, those switches will break the connection between the terminal 412 of plug 410 and the conductor 429; and the breaking of that connection will deenergize the solenoid 230, will deenergize the motor 188, will deenergize the solenoid 330, will deenergize the solenoid 344, and will deenergize the relays coils 446, 462 and 476. The deenergization of the coil 476 will permit the contact 472 to reopen and thus causes the deenergization of the relay coil 520. As a result, all of the electrical components of the currency detector will return to the positions shown by FIGS. 18 and 19. At this time, the currency detector will be ready for the insertion of a further bill.

In the foregoing description of the operation of the currency detector of FIG. 1, it was assumed that the inserted bill 400 was an authentic bill; but if that bill had been a spurious bill, that currency detector would have rejected that bill. For example, if that bill had been a spurious bill, the relay coil 428 would not have received two validating signals; and hence the relay coil 476 would not have been energized. This means that the relay coil 520 also would not have been energized, because that coil is energized only by the closing of the contacts 472.

If the relay coil 520 has not become energized, the contacts 526 would then have been unable to close to energize the solenoid 344. As a result, the gate 370 would have had no chance to move downwardly from its raised position. Also, the contacts 524 would have been unable to open to separate the conductor 434 from the terminal 412 of the plug 410. Moreover, the contacts 522 would have been unable to open; and that fact is important in connection with the actuation of the switch 290 by the leading edge of the inserted bill 400.

Specifically, as the inserted bill 400 causes the movable contact of the switch 290 to move down into engagement with the lower fixed contact, a circuit will be completed via conductor 452, junction 598, conductor 480, junction 481, conductor 432, contacts 524, conductor 434, the movable and the lower fixed contacts of switch 290, conductor 501, conductor 592, junctions 548 and 546, relay coil 544, junctions 574, 572, 582 and 590, and conductor 490. The resulting energization of the relay coil 544 will disconnect conductor 604 from the terminal 412, as by moving the contact 564 away from the contact 566; and the downward movement of the contact 564 will also establish a holding circuit for the relay coil 544 through the contacts 564 and 562. The coil 544 will also move the contacts 558 and 552 downwardly; and, as it does so, it will reverse the connections to the main winding of the motor 188. As a result, that motor will immediately start rotating in the opposite direction; and that rotation will cause the timing belts 270 and 272 to move the inserted bill 400 back toward the opening 38 in the front plate 36.

The movement of the contact 564 downwardly away from the contact 566 will also deenergize the solenoid 330; and thereupon the spring within that solenoid will move the plunger 332 to the position shown by FIG. 2. As a result, the roller 326 will be moved downwardly and away from the magnetic head 244. This is desirable because it will facilitate unhampered movement of the inserted bill 400 back to the opening 38 in the front plate 36.

As the inserted bill 400 moves forwardly and outwardly through the opening 38 in the front plate 36, the trailing edge of that bill will successively pass out of engagement with the actuator 288 for switch 286 and the actuators 276 and 280, respectively, for switches 274 and 278. The movement of that trailing edge out of engagement with the actuator 288 will not deenergize the solenoid 230 because of the switches 274 and 278 will keep that solenoid energized. However, as the trailing edge of the bill 400 moves out of engagement with the actuators 276 and 280, the switches 274 and 278 will return to their normally-open conditions; and, thereupon, the circuit to the solenoid 230 will be broken and the solenoid will become deenergized. As such time, the spring 222 will rotate the rocker arm 224 in the counter clockwise direction and thereby shift the U-shaped bracket 206 from the position shown by FIG. 4 to the position shown by FIG. 3. That shift in position will cause the front end of the U-shaped bracket 196 to raise upwardly and lift the leading edges of the timing belts 270 out of engagement with the leading edges of the timing belts 272. As the spring 222 rotated the U-shaped bracket 206, that spring also shifted the actuator 234 of the switch 232 and thereby reopened that switch. Thereupon, the motor 188 became deenergized and the currency detector came to rest. At such time, the bill 400 will be resting freely upon the platform 336, and the patron can easily retrieve that bill.

In this way, if the inserted bill does not coact with the magnetic head 244 to provide voltage variations that enable the unit 426 to produce two validating signals, the currency detector will not accept that bill. In such a case, the currency detector will not permit the bill to move all the way to the rear of the platens 50 and 94. Instead, that currency detector will halt the forward movement of that bill almost immediately after the leading edge of that bill engages the actuator 292 for the switch 290; and this means that the forward direction of the bill will be stopped while the leading edge of that bill is spaced almost half of the length of the platen 94 from the rear edge of that platen. Such an arrangement is desirable because it reduces the total time required to test and reject unacceptable bills.

If a passerby presses the push button 340 but does not insert a bill, the relay coil 528 will be energized and will thereby energize the solenoid 230. The energization of the solenoid 230 will cause the leading edges of the timing belts 270 to move downwardly into engagement with the leading edges of the timing belts 270, and it will also energize the motor 188. However, the bill-actuated switches 274 and 278 will not be actuated, because a bill was not inserted; and, after a predetermined period of time—less than a second after the push button 340 was released—the solenoid 230 will become deenergized. Thereupon, the leading edges of the timing belts 270 will be moved upwardly away from the leading edges of the timing belts 272, and the motor 188 will come to rest. Consequently, the passerby will not obtain the product held by the vending machine and will not obtain any change from the change maker.

If a patron inserts an authentic bill and then tries to hold onto the trailing edge of that bill, he will not get the desired product and will not get the desired change. Specifically, such a patron will not receive the desired product and will not receive the desired change because the inserted bill must go far enough toward the rear of the platens 50 and 94 to actuate the switches 294 and 298. As a result, a patron who holds onto the trailing edge of his bill will not obtain the desired product or the desired change. To obtain that product or change, the patron must let the belts 270 and 272 carry the bill all the way to the actuators 296 and 300 of the switches 294 and 298.

In the event a patron attaches a sturdy thread, tape or other member to the inserted bill and lets the leading edge of that bill pass the magnetic head 244 and then lets the leading edge of that bill pass far enough toward the rear of the platen 94 to actuate the switches 294 and 298, he will still not obtain the desired product or the desired change. Instead, the currency detector will reverse the motor 188 and will send the bill and its attached thread, tape or other member back to the patron. This is due to the fact that the thread, tape or other member attached to the bill will keep the gate 370 from moving downwardly far enough to shift the position of the movable contact of the switch 362. Consequently, when either of the switches 294 and 298 is closed, by having their actuators moved by the inserted bill, a circuit will be completed through the coil 544 of the motor-reversing relay via conductors 452 and 450, through switches 274, 278 and 286, conductors 502 and 429, junction 482, conductor 508, junction 510, switches 294 and 298, junction 512, the movable and left-hand fixed contacts of the switch 362, conductor 592, junctions 548 and 546, relay coil 544, junctions 574, 572, 582 and 590, and conductor 490. The resulting energization of the coil 544 will reverse the motor and will cause the timing belts 270 and 272 to send the inserted bill back to the opening 38 in the front plate 36. Hence, if a patron attaches a sturdy thread, tape or other member to the inserted bill, that patron will not obtain the desired product or the desired change but instead will have the inserted bill and its attachment returned to him.

If a patron attaches a very light thread, tape or other member to the inserted bill and lets the leading edge of that bill pass the magnetic head 244 and then lets the leading edge of that bill pass to the actuators of the switches 294 and 298, that bill will lead to the dispensing of the desired product or the desired change if that thread, tape or other member is light enough to let the gate 370 move down to its lowered position. The dispensing of that product or of that change is not objectionable because such a thread, tape or other member would be entirely too weak to be used to withdraw the bill from between the belts 270 and 272; and that bill will then be moved to the cash box.

It will be noted that the power for the relay coils 446, 462 and 476 is supplied through the conductor 429. This is desirable because it means that when the coil 544 of the motor reversing relay is energized to send a bill back, and when the bill-actuated switches reopen as that bill moves back, there will not be a direct connection between the terminals 412 of plug 410 and the relay coils 446, 462 and 476. This means that there is no possibility that a single validating signal from the unit 426 could be retained in the relay chain, including the relay coils 428, 446, 462 and 476, and could then be coupled with a further validating signal, obtained by the reinsertion of the unacceptable bill, to effect dispensing of the desired product or change. By completely disconnecting the relay coils 446, 462 and 476 from the terminal 412 of plug 410, whenever the coil 544 of the motor reversing relay is energized, the present invention completely cancels any residual effect of a validating signal.

The switch 290 coacts with the contacts 524 adjacent the coil 520 to provide an early sensing of the receipt or nonreceipt of the requisite two validating signals from the unit 426. If those signals were received, the contacts 524 would be open—because of the energization of coil 520—and the movement of the movable contact of switch 290 into engagement with the lower contact of that switch would not be able to energize the coil 544 of the motor reversing relay. In such event, the bill 400 would continue to move toward the rear plate 42. However, if those validating signals were not received, the switch 290 would act through the still-closed contacts 524 to energize the coil 544, and thereby effect prompt reversing of the direction of movement of the inserted bill. This prompt reversing is desirable, and it will lead to the prompt returning of that bill and to the prompt resetting of the currency detector.

Whenever the motor 188 reverses, the shaft 162 will start rotating in a direction opposite to its normal direction of rotation. It would be undesirable for the soft-faced rollers 314 and 321 to start rotating in directions opposite to their normal directions of rotation, because those rollers could be engaged by bills in the cash box and could tend to draw those bills forwardly through the opening 136 in the rear wall 42. The present invention keeps those rollers from rotating in such opposite directions; and it does so, in part, by forming the confronting faces of the clutch members 168 and 170 so the clutch member 168 can rotate in the clockwise direction in FIG. 2 without forcing the clutch member 170 to rotate. The prevention of rotation of the rollers 314 and 312 in directions opposite to their normal directions of rotation is also, in part, attained by using the deformation of the faces of those rollers to provide rotation-resisting forces. The overall result is that the motor 188 can reverse its direction of rotation without causing the soft-faced rollers 314 and 321 to reverse their directions of rotation. If desired, ratchet wheels could be associated with the soft-faced rollers 314 and 321 and pawls could be mounted adjacent those ratchet wheels to positively prevent rotation of those rollers in directions opposite to their normal directions of rotation. However, those ratchet wheels and pawls have not been found to be necessary.

The bill-actuated switches 274, 278 and 286 are desirable because they hold the solenoid 230 energized for whatever length of time is needed to effect the testing and acceptance or the testing and rejection of the inserted bill. For example, if an inserted bill was temporarily caught and held within the bill-transporting device, those switches would keep the motor 188 energized and thus give the bill a chance to work itself loose so it could be freed from that bill-transporting device. Such a result is desirable, but that result could not be provided by a timing circuit; because such a circuit would permit the solenoid 230 to become deenergized even though a bill was temporarily caught and held within the bill-transporting device. The bill-actuated switches 274, 278 and 286 are additionally desirable because the length of the time cycle which they provide is not affected by factors such as age or temperature. Some of the components of timing circuits can be affected by age and temperature, and hence those timing circuits can not provide a precisely determined time cycle for the solenoid 230.

Referring to FIGS. 21–24, a second embodiment of currency detector that is made in accordance with the principles and teachings of the present invention is shown. That embodiment uses the same frame that is used in the embodiment shown in FIG. 1; and the principal difference between the embodiment of FIGS. 21–24 and the embodiment shown in FIG. 1 is in the structure that is used to discharge an accepted bill. In the embodiment of FIG. 1, an accepted bill is moved to the rear ends of the platens 50 and 94 and is then discharged through the opening 136 in the rear plate 42. With the embodiment of FIGS. 21–24, however, an accepted bill is discharged by forcing that bill downwardly through the elongated slot 68 in the platen 50.

In FIGS. 21–23, the numeral 700 denotes a mounting bracket which is secured to, but is spaced a short distance behind, the vertical plate 130. That mounting bracket abuts that edge of the elongated slot 108 in the platen 94 which is closest to the vertical plate 130. The mounting bracket 700 has a horizontally-directed shelf 701 at the left-hand end thereof; and that bracket has a vertically directed slot 702 therein. As indicated particularly by FIG. 22, that slot is disposed to the right of the shelf 701.

The numeral 704 denotes a vertically-disposed ejector blade which has a straight, horizontally-directed lower edge, which has an arm 708 extending upwardly from the center thereof, and which has deep, generally triangular indentations in the upper edge thereof. Those indentations reduce the mass of that blade and thereby reduce the inertia of that blade. The lower edge of the blade 704 is provided with a slot; and a bill-engaging insert 706 is fixedly clamped within that slot.

The ejector blade 704 is disposed behind the mounting bracket 700, and that blade is thus in register with the slots 108 and 68, respectively, in the platens 94 and 50. The upwardly extending arm 708 of the blade 704 is aligned with the slot 702 in that bracket; and a pin 710 which is carried by that arm extends forwardly through that slot. A second, but shorter, pin 712 which is carried by the arm 708 extends forwardly through the slot 702. A bearing plate 714 has openings therein which accommodate the forward ends of the pins 710 and 712; and that plate abuts the front face of the mounting bracket 700 and projects laterally outwardly beyond the sides of the slot 702. That plate is fixedly secured to the pins 710 and 712; and it coacts with those pins and with the slot to permit vertical reciprocation of the ejector blade 704 while preventing separation of that plate from the mounting bracket 700.

The numeral 716 denotes a generally triangular mounting plate; and that plate is secured to, and abuts the front face of, the vertical plate 130. A pivot 718 is secured to, and projects forwardly from, the mounting plate 716; and a rocker arm 720 is rotatably mounted on that pivot. That rocker arm has a closed end 721 and it has an extension 722; and that extension projects to the left from that closed end. A link 724 has the lower end thereof rotatably secured to the left-hand end of the extension 722 by a pin joint 726; and the upper end of that link is rotatably secured to the forward end of the pin 710. That forward end of that pin projects forwardly beyond the forward end of the pin 712, and it also projects forwardly beyond the front face of the bearing plate 714 to engage and hold the upper end of the link 724.

A helical extension spring 728 has one end thereof hooked through an opening in the extension 722 of the rocker arm 720 and has the other end thereof hooked through an ear 730 on the mounting bracket 700. A helical extension spring 732 has one end thereof hooked through an opening at the bottom of the rocker arm 720 and has the other end thereof hooked through an ear 734 on the mounting plate 716. The spring 732 is under tension at all times, but the spring 728 is free of tension whenever the rocker arm 720 is in the position shown by FIG. 21. However, that spring will be extended and will thus be stressed whenever the rocker arm 720 is rotated to the position shown by FIG. 22.

The numeral 736 denotes a solenoid which is mounted on the shelf 701 of the mounting bracket 700. That solenoid has a plunger 738, and that plunger is connected to the upper end of the rocker arm 720 by a connecting rod 740. Pin joints 742 and 744, respectively, secure that connecting rod to the plunger 738 and to the upper end of the rocker arm 720. Whenever the plunger 738 of the solenoid 736 is in its normal extended position, it will permit the spring 732 to hold the rocker arm 720 in the position shown by FIG. 21; and it will thereby enable that spring and the rocker arm to hold the ejector blade 704 in the raised position indicated by FIGS. 21 and 23. However, when that plunger is moved to retracted position, it will act through the connecting rod 740 to rotate the rocker arm 720 in the counter clockwise direction, and such rotation will cause the extension 722 of that rocker arm to force the ejector blade 704 downwardly through the slots 108 and 68.

Two switches 746 and 750 are mounted to the right of the upper end of the rocker arm 720 in FIGS. 21 and 22, but the switch 750 is disposed directly behind, and is hidden by, the switch 746. The switch 746 has an actuator 748, and the switch 750 has a similar actuator. Both of those actuators are in register with the closed end 721 of the rocker arm 720, and that rocker arm will engage those actuators whenever that rocker arm is in the position shown by FIG. 21. The numeral 754 denotes a switch which is mounted above the rocker arm 720; and that switch has an actuator 756 which is in the path of the closed end 721 of the rocker arm. However, the actuator 756 is normally spaced from the closed end 721 of that rocker arm. The numeral 758 denotes a relay which is mounted on the rear face of the mounting bracket 700; and that relay has normally open contacts 760 and has normally closed contacts 762.

The rocker arm 720 is normally in the position shown by FIG. 21; and whenever that rocker arm is in that position, the closed end 721 of that rocker arm will maintain the switches 746 and 750 open and will permit the switch 754 to remain open. As the plunger 738 and the connecting rod 740 force the rocker arm 720 to rotate from the position of FIG. 21 to the position of FIG. 22, the closed end 721 of that rocker arm will move out of engagement with the actuators of the switches 746 and 750 and will permit those switches to close. As the rocker arm 720 nears the end of its counter clockwise stroke, and thus moves the ejector blade 704 down to the bottom of its stroke, the closed end 721 of that rocker arm will engage the actuator 756 of the switch 754 and will cause that switch to close. As the spring 732 returns the rocker arm 720 to its initial position, that rocker arm will permit the switch 754 to open and will then force the switches 746 and 750 to open.

The electrical circuit which is used with the embodiment shown in FIGS. 21–23 is very similar to the electrical circuit which is used with the embodiment shown in FIG. 1; but it is not identical with that circuit. For example, the lead 596 which extends to the right-hand fixed contact of the switch 362 in FIG. 18 does not extend to that contact in FIG. 24. Instead, that lead is connected to a lead 778 by a junction 780; and the latter lead extends to movable contact of switch 746. Further, the right-hand fixed contact of the switch 362 in FIG. 24 is connected to the movable contact of relay contacts 762 by a conductor 782.

The other differences between the circuit used with the embodiment of currency detector in FIGS. 21–23 and the circuit used with the embodiment of currency detector in FIG. 1 are in the nature of additions. The additive nature of those changes can best be appreciated by comparing the circuit of FIG. 24 with that portion of the circuit in FIG. 18 which is enclosed by the dashed line 790. To modify the circuit of FIG. 18 for use with the embodiment of currency detector shown in FIGS. 21–23, it is only necessary to substitute the circuit of FIG. 24 for that portion of the circuit of FIG. 18 which is enclosed by the dashed line 790.

In FIG. 24, a conductor 784 extends between the junction 512 and the movable contact of the relay contacts 760, the fixed contact of switch 750 and the movable contact of switch 754. Furthermore, one end of a conductor 774 is connected to the conductor 490 by a junction 772; while the other end of that conductor is connected to the lower terminal of the coil of relay 758 and to the lower terminal of the solenoid 736. A conductor 776 and a junction 770 connect the fixed contact of the switch 746 and the movable contact of the switch 750 to the conductor 452. The fixed contact of the relay contacts 760 is connected to the upper terminal of the coil of relay 758 and to the fixed contact of switch 754. The fixed contact of the relay contacts 762 is connected to the upper terminal of the solenoid 736.

In addition to the foregoing circuit changes between the embodiment of currency detector of FIG. 1 and the currency detector of FIGS. 21–23, there are certain changes in the locations of the electrical components of those embodiments of currency detector. For example, while the motor 188, the condenser 190 and the connector 195 of the embodiment of currency detector of FIG. 1 can be located intermediate the platen 50 and the base 31, the motor 188 and the condenser 190 and the connector 195 of the embodiment of currency detector of FIGS. 21–23 are disposed to the rear of that platen. Furthermore, the actuators of the switches 294 and 298 of the embodiment of currency detector of FIGS. 21–23 are spaced further from the rear of the platen 94, as indicated by FIG. 21.

By disconnecting the conductor 596 from the right-hand fixed contact of the switch 362, FIG. 24 keeps the switches 294 and 298 from causing the energization of the coil 578 of the accept or vend relay. In FIG. 24, the energization of the coil is effected by the closing of the switch 746. This means that the coil 578 will not be energized until the solenoid 736 is energized and starts the ejector blade 704 moving downwardly.

In the operation of the embodiment of currency detector of FIGS. 21–24, the pressing of the push button 340 will cause the solenoid 230 to be energized; and the energization of that solenoid will cause the leading edges of the belts 270 to move down into engagement with the leading edges of the belts 272. The energization will also start the motor 188 running in the forward direction. The inserted bill 400 will start moving toward the rear of the platen 94, and the leading edge of that bill will successively actuate the switches 274, 278 and 286 to maintain the energization of the solenoid 230. That leading edge of the bill will also actuate the switch 282 and thereby energize the solenoid 330; and that energization will cause the soft-faced roller 326 to force the inserted bill 400 into intimate engagement with the magnetic head 244. Continued movement of the timing belts 270 and 272 will cause the leading edge of the inserted bill to engage the switch 290. If the tuned amplifier and control element within the unit 426 have supplied two validating signals to the relay chain, which includes the relay coils 428, 446, 462 and 476, the relay coil 520 will have been energized by the closing of contacts 472; and the actuation of the switch 290 will not be able to energize the coil 544 of the motor-reversing relay.

The energization of the coil 520 will energize the solenoid 344, by closing the contacts 526; and such energization will rotate the U-shaped bracket 354 in the counter clockwise direction in FIG. 15. If the inserted bill does not have a thread, tape or other member attached to it, the gate 370 will move down far enough to permit the movable contact of the switch 362 to shift into engagement with its right-hand contact. That engagement will not have any immediate affect, and the inserted bill will continue to move toward the rear of the platens 50 and 94 until the leading edge of that bill actuates the switches 294 and 298. When those switches are actuated, a circuit will be completed via conductors 452 and 450, switches 274, 278 and 286, conductor 502, conductor 429, junction 482, conductor 508, junction 510, switches 294 and 298, junction 512, the movable and right-hand contacts of switch 362, conductor 782, relay contacts 762, solenoid 736, conductor 774, junction 772, and conductor 490. The resulting energization of the solenoid 736 will act through the connecting rod 740 to rotate the rocker arm 720 in the counter clockwise direction. Such rotation will move the left-hand end of the extension 722 downwardly and will force the ejector blade 704 downwardly through the slots 108 and 68, respectively, in the platens 94 and 50. Such downward movement of the ejector blade 704 will be rapid and will pull the elongated sides of the inserted bill 400 out from between the confronting faces of the timing belts 270 and 272. That bill will tend to fold upwardly along the sides of the ejector blade 704 as that bill is forced down through the slots 108 and 68; and that bill will be transferred to a cash box disposed below the platen 50.

As the rocker arm 720 starts rotating in the counter clockwise direction about the pivot 718, the closed end 721 of that rocker arm will permit the switches 746 and 750 to close; and those switches will close before the inserted bill can be moved out of engagement with the actuators of the switches 274, 278, 286, 294 and 298. The closing of the switch 750 will complete a circuit via conductor 452, junction 770, conductor 776, switch 750, conductor 784, junction 512, the movable and right-hand fixed contacts of switch 362, conductor 782, relay contacts 762, solenoid 736, conductor 774, junction 772 and conductor 490; and that circuit will keep that solenoid energized. The closing of the switch 746 will complete a circuit via conductor 452, junction 770, conductor 776, switch 746, conductor 778, junction 780, conductor 596, relay coil 578, junctions 582 and 590, and conductor 490. The energization of that relay coil causes the contacts 584 to interconnect the conductors 514 and 516, causes the contacts 588 to interconnect the conductors 518 and 519, and causes the contacts 586 to connect the conductor 452 to the conductor 429. The connection of conductor 452 to the conductor 429 establishes a path that is parallel to the paths through the bill-actuated switches 274, 278, 286, 294 and 298; and hence the subsequent reopening of those switches can not deenergize the solenoid 230.

When the ejector blade 704 reaches the bottom of its stroke, the closed end 721 of the rocker arm 720 will close the switch 754; and a circuit will be completed via conductor 452, junction 770, conductor 776, switch 750, switch 754, the coil of relay 758, conductor 774, junction 772, and conductor 490. The resulting energization of the coil of relay 758 will open the contacts 762 and close the contacts 760. The opening of the contacts 762 will deenergize the solenoid 736, and thereby permit the springs 728 and 732 to start raising the ejector blade 704. The closing of the contacts 760 will complete a circuit via conductor 452, junction 770, conductor 776, switch 750, contacts 760, the coil of relay 758, conductor 774, junction 772, and conductor 490. As a result, the coil of the relay 758 will be kept energized even though the switch 754 will open as soon as the ejector blade 704 starts moving back upwardly toward its normal position. As the ejector blade 704 reaches its normal position, the closed end 721 of the rocker arm 720 will reopen the switches 746 and 750; and thereupon all of the electrical components of FIGS. 24, 18 and 19 will return to their normal positions.

The operation of the embodiment of currency detector of FIGS. 21-24 will be the same as the operation of the embodiment of currency detector of FIG. 1 in the event an inserted bill can not coact with the magnetic head 244 to produce voltage variations that will enable the unit 426 to supply two validating signals. Similarly, the operation of the embodiment of currency detector of FIGS. 21-24 will be the same as the operation of the embodiment of currency detector of FIG. 1 in the event a patron holds onto the trailing edge of the inserted bill. Moreover, the operation of the embodiment of currency detector of FIGS. 21-24 will be the same as the operation of the embodiment of currency detector of FIG. 1 in the event a patron attaches a thread, tape or other member to the inserted bill. As a result, the embodiment of currency detector of FIGS. 21-24 will reject unacceptable bills but will promptly direct acceptable bills to a cash box below the platen 50.

The undulations of the confronting faces of the timing belts 270 and 272 in both embodiments of currency detector will provide corresponding undulations in the inserted bill 400. Those undulations in the bill are desirable because they will tend to stiffen that bill and to eliminate any wrinkles or bends due to folds in that bill, on or parallel to the longitudinally-extending center line of that bill. The undulations of the confronting faces of the timing belts 270 and 272 will thus help stiffen the inserted bill as well as provide spaced pressure points where the belts recurrently press against and grip the opposite faces of that bill.

The undulations in the confronting faces of the timing belts 270 and 272 are important, but they are not of undue amplitude. As a result, the guide plates 138 and 140 can be made thick enough to be more than coextensive with the side edges of the inserted bill as those side edges undulate. This is desirable because it enables those guide plates to effectively limit the skewing of the inserted bill. In addition, the platens 50 and 94 will project inwardly beyond the confronting faces of the guide plates 138 and 140 to keep the side edges of the inserted bills from riding down under or riding up over the bottom or top surfaces of those guide plates. As a result, skewing of bills is substantially eliminated.

The timing belts 270 and 272 will grip each bill at two points at the front of that bill; and this is desirable because it gives full support to the portions of the leading edge of that bill which are intermediate those points. Such portions of the leading edge are the portions which engage the actuators 276, 280, 284, 288, 292, 296 and 300; and those portions can resist any tendency to crumple or roll up. Not only are those portions intermediate the pairs of timing belts 270 and 272, but they are immediately adjacent one or the other of those pairs of belts.

Furthermore, the actuators 276, 280, 284, 288, 292, 296 and 300 will not apply very heavy forces to the leading edges of the inserted bills. Not only are the radii of curvature of those actuators large—in some cases being as large as one and one half inches—but those actuators are set with their chords generally parallel to the path of movement of the inserted bill. The overall result is that the inserted bills actuate the switches 274, 278, 282, 286, 290, 294 and 298 without any crumpling or rolling up of the leading edges of those bills.

The platen 50 is shown in FIGS. 7 and 8 as having a large number of openings therein. Some of those openings are extra openings, and other of those openings are provided for standardization of parts. For example, the opening 78 in the platen 50 is not used; but that opening is identical to the opening 120 in the platen 94, and the latter opening is used to accommodate the spur gear 166.

Conversely, the opening 118 in the platen 94 is not used; but that opening is identical to the opening 76 in the platen 50, and the latter opening is used to accommodate the spur gear 182.

Whereas the drawing and accompanying description have shown and described two preferred embodiments of the present invention, it should be apparent to those skilled in the art that various changes may be made in the form of the invention without affecting the scope thereof.

What I claim is:

1. In a bill-transporting device, a mechanism to test the authenticity of a bill, a belt, pulleys that support said belt, a second belt, pulleys that support said second belt and hold one face of said second belt in confronting relation with one face of the first said belt, a third belt that is spaced from the first said belt, pulleys that support said third belt, a fourth belt that is spaced from said second belt, pulleys that support said fourth belt and hold one face of said fourth belt in confronting relation with one face of said third belt, said one face of said third belt being coplanar with said one face of said first belt, said one face of said fourth belt being coplanar with said one face of said second belt, said one face of said first belt and said one face of said second belt being adapted to grip a bill adjacent one edge of said bill but to permit said one edge of said bill to project outwardly beyond said one face of said first belt and said one face of said second belt, said one face of said third belt and said one face of said fourth belt being adapted to grip said bill adjacent the opposite edge of said bill but to permit said opposite edge of said bill to project outwardly beyond said one face of said third belt and said one face of said fourth belt, members that engage said first and third belts at points spaced along the lengths of said first and third belts to bow said one faces of said first and third belts, respectively, toward said one faces of said second and fourth belts, members that engage said second and fourth belts at points spaced along the lengths of said second and fourth belts to bow said one faces of said second and fourth belts, respectively, toward said one faces of said first and third belts, the members that bow said one faces of said first and third belts, respectively, toward said one faces of said second and fourth belts being displaced from the members that bow said one faces of said second and fourth belts, respectively, toward said one faces of said first and third belts, whereby said points along the lengths of said first and third belts, respectively, are staggered relatively to said points along the lengths of said second and fourth belts and thereby provide an undulating configuration for said one faces of said belts, said members causing said faces of said belts to undulate forwardly and rearwardly of said authenticity-testing mechanism, a guide plate that is adjacent said one faces of said first and second belts and that extends along and that is generally coextensive with said one faces of said first and second belts, a second guide plate that is adjacent said one faces of said third and fourth belts and that extends along and that is generally coextensive with said one faces of said third and fourth belts, said guide plates being adapted to receive the edges of any inserted bills that are held by said belts and that tend to become skewed as they are moved by said belts and to thereby limit the skewing of said bills, confining surfaces disposed above and below said one edge of said bill to confine and guide said one edge of said bill, further confining surfaces disposed above and below said opposite edge of said bill to confine and guide said opposite edge of said bill, the first said confining surfaces being spaced apart a distance at least as great as the sum of the heights of an upward and a downward undulation of the first said and said second belts, said further confining surfaces being spaced apart a distance at least as great as the sum of the heights of an upward and a downward undulation of said third and said fourth belts, the pulleys adjacent the leading edges of said second and said fourth belts being movable to move said leading edges of said second and fourth belts, respectively, toward and away from the leading edges of said first and third belts, a spring that urges said pulleys adjacent said leading edges of said second and said fourth belts, respectively, away from said leading edges of said first and third belts, an actuating member that can urge said pulleys adjacent said leading edges of said second and said fourth belts, respectively, toward said leading edges of said first and third belts, a connection between said actuating member and said pulleys adjacent said leading edges of said second and said fourth belts to enable said actuating member to move said pulleys adjacent said leading edges of said second and said fourth belts, said actuating member being electromagnetic and responding to energization thereof to move said pulleys adjacent said leading edges of said second and said fourth belts, and a lost motion mechanism in said connection that yields after said leading edges of said second and said fourth belts, respectively, have been moved into engagement with said leading edges of said first and third belts.

2. In a bill-transporting device, a mechanism to test the authenticity of a bill, a belt, pulleys that support said belt, a second belt, pulleys that support said second belt and held one face of said second belt in confronting relation with one face of the first said belt, a third belt that is spaced from the first said belt, pulleys that support said third belt, a fourth belt that is spaced from said second belt, pulleys that support said fourth belt and hold one face of said fourth belt in confronting relation with one face of said third belt, said one face of said third belt being coplanar with said one face of said first belt, said one face of said fourth belt being coplanar with said one face of said second belt, said one face of said first belt and said one face of said second belt being adapted to grip a bill adjacent one edge of said bill but to permit said one edge of said bill to project outwardly beyond said one face of said first belt and said one face of said second belt, said one face of said third belt and said one face of said fourth belt being adapted to grip said bill adjacent the opposite edge of said bill but to permit said opposite edge of said bill to project outwardly beyond said one face of said third belt and said one face of said fourth belt, members that engage said first and third belts at points spaced along the lengths of said first and third belts to bow said one faces of said first and third belts, respectively, toward said one faces of said second and fourth belts, members that engage said second and fourth belts at points spaced along the lengths of said second and fourth belts to bow said one faces of said second and fourth belts, respectively, toward said one faces of said first and third belts, the members that bow said one faces of said first and third belts, respectively, toward said one faces of said second and fourth belts being displaced from the members that bow said one faces of said second and fourth belts, respectively, toward said one faces of said first and third belts, whereby said points along the lengths of said first and third belts, respectively, are staggered relative to said points along the lengths of said second and fourth belts and thereby provide an undulating configuration for said one faces of said belts, said members causing said faces of said belts to undulate forwardly and rearwardly of said authenticity-testing mechanism, a guide plate that is adjacent said one faces of said first and second belts and that extends along and that is generally coextensive with said one faces of said first and second belts, a second guide plate that is adjacent said one faces of said third and fourth belts and that extends along and that is generally coextensive with said one faces of said third and fourth belts, said guide plates being adapted to receive the edges of any inserted bills that are held by said belts and that tend to become skewed as they are moved by said belts and to thereby limit the skewing of said bills, confining surfaces disposed above and below said one edge of said bill to confine and guide said one edge of said bill, further confining surfaces disposed above and below said opposite edge of said bill to confine and guide said opposite edge of said bill, the first said confining surfaces being spaced apart a distance at least as great as the sum of the heights of an upward and a downward undulation of the first said and said second belts, said further confining surfaces being spaced apart a distance at least as great as the sum of the heights of an upward and a downward undulation of said third and said fourth belts, the pulleys adjacent the leading edges of said second and said fourth belts being movable to move said leading edges of said second and fourth belts, respectively, toward and away from the leading edges of said first and third belts, and an actuating member that can urge said pulleys adjacent said leading edges of said second and said fourth belts, respectively, toward said leading edges of said first and third belts.

3. In a bill-transporting device, a mechanism to test the authenticity of a bill, a belt, pulleys that support said belt, a second belt, pulleys that support said second belt and hold one face of said second belt in confronting relation with one face of the first said belt, a third belt that is spaced from the first said belt, pulleys that support said third belt, a fourth belt that is spaced from said second belt, pulleys that support said fourth belt and hold one face of said fourth belt in confronting relation with one face of said third belt, said one face of said third belt being coplanar with said one face of said first belt, said one face of said fourth belt being coplanar with said one face of said second belt, said one face of said first belt and said one face of said second belt being adapted to grip a bill adjacent one edge of said bill but to permit said one edge of said bill to project outwardly beyond said one face of said first belt and said one face of said second belt, said one face of said third belt and said one face of said fourth belt being adapted to grip said bill adjacent the opposite edge of said bill but to permit said opposite edge of said bill to project outwardly beyond said one face of said third belt and said one face of said fourth belt, members that engage said first and third belts at point spaced along the lengths of said first and third belts to bow said one faces of said first and third belts, respectively, toward said one faces of said second and fourth belts, members that engage said second and fourth belts, at points spaced along the lengths of said second and fourth belts to bow said one face of said second and fourth belts, respectively, toward said one faces of said first and third belts, the members that bow said one faces of said first and third belts, respectively, toward said one faces of said second and fourth belts being displaced from the members that bow said one faces of said second and fourth belts, respectively, toward said one faces of said first and third belts, whereby said points along the lengths of said first and third belts, respectively, are staggered relative to said points along the lengths of said second and fourth belts and thereby provide an undulating configuration for said one face of said belts, said members causing said faces of said belts to undulate forwardly and rearwardly of said authenticity-testing mechanism, a guide plate that is adjacent said one faces of said first and second belts and that extends along and that is generally coextensive with said one faces of said first and second belts, and a second guide plate that is adjacent said one faces of said third and fourth belts and that extends along and that is generally coextensive with said one faces of said third and fourth belts, said guide plates being adapted to receive the edges of any inserted bills that are held by said belts and that tend to become skewed as they are moved by said belts and to thereby limit the skewing of said bills, confining surfaces disposed above and below said one edge of said bill to confine and guide said one edge of said bill, further confining surfaces disposed above and below said opposite edge of said bill to confine and guide said opposite edge of said bill, the first said confining surfaces being spaced apart a distance at least as great as the sum of the heights of an upward and a downward undulation of the first said and said second belts, said further confining surfaces being spaced apart a distance at least as great as the sum of the heights of an upward and a downward undulation of said third and said fourth belts, the pulleys adjacent the leading edges of said second and said fourth belts being movable to move said leading edges of said second and fourth belts, respectively, toward and away from the leading edges of said first and third belts, the movement of said pulleys adjacent said leading edges of said second and said fourth belts away from said leading edges of said first and third belts facilitating the insertion of said bill between said leading edges of said second and said fourth belts, respectively, and said leading edges of said first and third belts.

4. In a bill-transporting device, a mechanism to test the authenticity of a bill, a belt, pulleys that support said belt, a second belt, pulleys that support said second belt and hold one face of said second belt in confronting relation with one face of the first said belt, a third belt that is spaced from the first said belt, pulleys that support said third belt, a fourth belt that is spaced from said second belt, pulleys that support said forth belt and hold one face of said fourth belt in confronting relation with one face of said third belt, said one face of said first belt and said one face of said second belt being adapted to grip one edge of a bill but to permit said one edge of said bill to project outwardly beyond said one face of said first belt and said one face of said second belt, said one face of said third belt and said one face of said fourth belt also being adapted to grip the opposite edge of said bill but to permit said opposite edge of said bill to project outwardly beyond said one face of said third belt and said one face of said fourth belt, members that engage said first and third belts at points spaced along the lengths of said first and third belts to bow said one faces of said first and third belts, respectively, toward said one faces of said second and fourth belts, members that engage said second and fourth belts at points spaced along the lengths of said second and fourth belts to bow said one faces of said second and fourth belts, respectively, toward said one faces of said first and third belts, the members that bow said one faces of said first and third belts, respectively, toward said one faces of said second and fourth belts being displaced from the members that bow said one faces of said second and fourth belts, respectively, toward said one faces of said first and third belts, whereby said points along the lengths of said first and third belts, respectively, are staggered relative to said points along the lengths of said second and fourth belts and thereby provide an undulating configuration for said one faces of said belts, said members causing said faces of said belts to undulate forwardly and rearwardly of said authenticity-testing mechanism, a guide plate that is adjacent said one faces of said first and second belts and that extends along and that is generally coextensive with said one faces of said first and second belts, and a second guide plate that is adjacent said one faces of said third and fourth belts and that extends along and that is generally coextensive with said one faces of said third and fourth belts, said guide plates being adapted to receive the edges of any inserted bills that are held by said belts and that tend to become skewed as they are moved by said belts and to thereby limit the skewing of said bills, confining surfaces disposed above and below said one edge of said bill to confine and guide said one edge of said bill, further confining surfaces disposed above and below said opposite edge of said bill to confine and guide said opposite edge of said bill, the first said confining surfaces being spaced apart a distance at least as great as the sum of the heights of an upward and a downward undulation of the first said and said second belts, said further confining surfaces being spaced apart a distance at least as great as the sum of the heights of an upward and a downward undulation of said third and said fourth belts, the pulleys adjacent the leading edges of said second and said fourth belts being movable to move said leading edges of said second and fourth belts, respectively, toward and away from the leading edges of said first and third belts, the movement of said pulleys adjacent said leading edges of said second and said fourth belts away from said leading edges of said first and third belts facilitating the insertion of said bill between said leading edges of said second and said fourth belts, respectively, and said leading edges of said first and third belts.

5. In a bill-transporting device, a mechanism to test the authenticity of a bill, a belt, pulleys that support said belt, a second belt, pulleys that support said second belt and hold one face of said second belt in confronting relation with one face of the first said belt, a third belt that is spaced from the first said belt, pulleys that support said third belt, a fourth belt that is spaced from said second belt, pulleys that support said fourth belt and hold one face of said fourth belt in confronting relation with one face of said third belt, said one face of said first belt and said one face of said second belt being adapted to grip one edge of a bill but to permit said one edge of said bill to project outwardly beyond said one face of said first belt and said one face of said second belt, said one face of said third belt and said one face of said fourth belt also being adapted to grip the opposite edge of said bill but to permit said opposite edge of said bill to project outwardly beyond said one face of said third belt and said one face of said fourth belt, members that engage said first and third belts to bow said one faces of said first and third belts, respectively, toward said one faces of said second and fourth belts, members that engage said second and fourth belts to bow said one faces of said second and fourth belts, respectively, toward said one faces of said first and third belts, the members that bow said one faces of said first and third belts, respectively, toward said one faces of said second and fourth belts being displaced from the members that bow said one faces of said second and fourth belts, respectively, toward said one faces of said first and third belts, whereby said belts have an undulating configuration, said members causing said belts to undulate forwardly and rearwardly of said authenticity-testing mechanism, a guide plate that is adjacent said one faces of said first and second belts and that extends along and that is generally coextensive with said one faces of said first and second belts, and a second guide plate that is adjacent said one faces of said third and fourth belts and that extends along and that is generally coextensive with said one faces of said third and fourth belts, said guide plates being adapted to receive the edges of any inserted bills that are held by said belts and that tend to become skewed as they are moved by said belts and to thereby limit the skewing of said bills, confining surfaces disposed above and below said one edge of said bill to confine and guide said one edge of said bill, further confining surfaces disposed above and below said opposite edge of said bill to confine and guide said opposite edge of said bill, the first said confining surfaces being spaced apart a distance at least as great as the sum of the heights of an upward and a downward undulation of the first said and said second belts, said further confining surfaces being spaced apart a distance at least as great as the sum of the heights of an upward and a downward undulation of said third and said fourth belts, the pulleys adjacent the leading edges of said second and said fourth belts being movable to move said leading edges of said second and fourth belts, respectively, toward and away from the leading edges of said first and third belts, the movement of said pulleys adjacent said leading edges of said second and said fourth belts away from said leading edges of said first and third belts facilitating the insertion of said bill between said leading edges of said second and said fourth belts, respectively, and said leading edges of said first and third belts.

6. In a bill-transporting device, a belt, pulleys that support said belt, a second belt, pulleys that support said second belt and hold one face of said second belt in confronting relation with one face of the first said belt, a third belt that is spaced from the first said belt, pulleys that support said third belt, a fourth belt that is spaced from said second belt, pulleys that support said fourth belt and hold one face of said fourth belt in confronting relation with one face of said third belt, said one face of said first belt and said one face of said second belt being adapted to grip one edge of a bill but to permit said one edge of said bill to project outwardly beyond said one face of said first belt and said one face of said second belt, said one face of said third belt and said one face of said fourth belt also being adapted to grip the opposite edge of said bill but to permit said opposite edge of said bill to project outwardly beyond said one face of said third belt and said one face of said fourth belt, members that engage said first and third belts to bow said one faces of said first and third belts, respectively, toward said one faces of said second and fourth belts, members that engage said second and fourth belts to bow said one faces of said second and fourth belts, respectively, toward said one faces of said first and third belts, a guide plate that is adjacent said one faces of said first and second belts and that extends along and that is generally coextensive with said one faces of said first and second belts, a second guide plate that is adjacent said one faces of said third and fourth belts and that extends along and that is generally coextensive with said one faces of said third and fourth belts, said guide plates being adapted to receive the edges of any inserted bills that are held by said belts and that tend to become skewed as they are moved by said belts and to thereby limit the skewing of said bills, confining surfaces disposed above and below said one edge of said bill to confine and guide said one edge of said bill, further confining surfaces disposed above and below said opposite edge of said bill to confine and guide said opposite edge of said bill.

7. In a bill-transporting device, a mechanism to test the authenticity of a bill, a belt, pulleys that support said belt, a second belt, pulleys that support said second belt and hold one face of said second belt in confronting relation with one face of the first said belt, said one face of said first belt and said one face of said second belt being adapted to grip one edge of a bill but to permit said one edge of said bill to project outwardly beyond said one face of said first belt and said one face of said second belt, a member that engages said first belt and urges said one face of said first belt toward said one face of said second belt, a member that engages said second belt and urges said one face of said second belt toward said one face of said first belt, said members providing undulating configurations for said belts, said members causing said faces of said belts to undulate forwardly and rearwardly of said authenticity-testing mechanism, a guide plate that is adjacent one edge of said bill, and a second guide plate that is adjacent the opposite edge of said bill, one of said guide plates extending along and being generally coextensive with said one faces of said belts, said guide plates being adapted to receive the edges of any inserted bills that tend to become skewed as they are moved by said belts and to thereby limit the skewing of said bills, and confining surfaces disposed above and below said one edge of said bill to confine and guide said one edge of said bill, said confining surfaces being spaced apart a distance at least as great as the sum of the heights of an upward and a downward undulation of the first said and said second belts.

8. In a bill-transporting device, a belt, pulleys that support said belt, a second belt, pulleys that support said second belt and hold one face of said second belt in confronting relation with one face of the first said belt, a motor that drives said belts, the pulley adjacent the leading edge of said second belt being movable to move said leading edge of said second belt toward and away from a position where it can engage a bill and force said bill against the first said belt, and a member that can urge the pulley adjacent said leading edge of said second belt to move said leading edge of said second belt toward said position, the movement of said pulley adjacent said leading edge of said second belt to move said leading edge of said second belt away from said position to facilitate the introduction of said bill intermediate said belts, said member being electromagnetic and having a movable element which is connected to said pulley adjacent said leading edge of said second belt by a linkage having a yielding connection therein, said movable element and said linkage moving said pulley adjacent said leading edge of said second belt to its fully moved position before said movable element has reached its fully moved position, said yielding connection in said linkage then yielding to permit said movable element to continue to move to its fully moved position.

9. In a bill-transporting device, belts that grip an inserted bill and move said bill parallel to an axis of said bill, guide plates that are disposed adjacent said belts and that extend along and that are generally coextensive with the confronting faces of said belts to limit any tendency of said bill to skew as it is moved by said belts, and confining surfaces that overlie and underlie said bill and keep said bill from bowing upwardly or downwardly to avoid said guide plates.

10. In a bill-transporting device, bill-gripping members that can grip an inserted bill and move said bill along a predetermined path, a guide member that is disposed adjacent said path and that has one face thereof parallel to said path, a second guide member that is disposed adjacent said path and that has one face thereof parallel to said path, said one faces of said guide plates being spaced apart a distance greater than the width of said bill but being closely adjacent the edges of said bill as said bill is moved along said predetermined path, said guide members extending along and being generally coextensive with said predetermined path and being adapted to limit skewing movement of said bill as said bill is being moved along said predetermined path, and confining surfaces that overlie and underlie said bill and keep said bill from bowing upwardly or downwardly, said confining surfaces being the confronting faces of platens that overlie and underlie said bill as said bill is moved along said predetermined path, said confining surfaces coacting with said bill-gripping members and said guide members to substantially completely enclose and confine said bill as said bill is moved along said predetermined path.

11. In a bill-transporting device, belts that grip an inserted bill and move said bill parallel to an axis of said bill, and guide plates that are disposed adjacent said belts and that extend along and that are generally coextensive with the confronting faces of said belts to limit any tendency of said bill to skew as it is moved by said belts, and members that abut the upper and lower faces of said guide plates and that extend inwardly beyond said guide plates to overlie and underlie the edges of said bill as said bill is moved by said belts, said members keeping the edges of said bill from engaging and then riding up over or riding down under said guide plates, said members being platens that overlie and underlie said bill as said bill is moved parallel to its axis, said members coacting with said belts and said guide plates to substantially completely enclose and confine said bill as said bill is moved parallel to its axis, said guide plates also acting as spacers and thereby maintaining a predetermined distance between the confronting faces of said members.

12. In a bill-transporting device, a belt, pulleys that support said belt, a second belt, pulleys that support said second belt and hold one face of said second belt in confronting relation with one face of the first said belt, a third belt that is spaced from the first said belt, pulleys that support said third belt, a fourth belt that is spaced from said second belt, pulleys that support said fourth belt and hold one face of said fourth belt in confronting relation with one face of said third belt, said one face of said third belt being coplanar with said one face of said first belt, said one face of said fourth belt being coplanar with said one face of said second belt, said one face of said first belt and said one face of said second belt being adapted to grip a bill adjacent one edge of said bill but to permit said one edge of said bill to project outwardly beyond said one face of said first belt and said one face of said second belt, said one face of said third belt and said one face of said fourth belt being adapted to grip said bill adjacent the opposite edge of said bill but to permit said opposite edge of said bill to project outwardly beyond said one face of said third belt and said one face of said fourth belt, members that engage said first and third belts at points spaced along the lengths of said first and third belts to bow said one faces of said first and third belts, respectively, toward said one faces of said second and fourth belts, and members that engage said second and fourth belts at points spaced along the lengths of said second and fourth belts to bow said one faces of said second and fourth belts, respectively, toward said one faces of said first and third belts, the members that bow said one faces of said first and third belts, respectively, toward said one faces of said second and fourth belts being displaced from the members that bow said one faces of said second and fourth belts, respectively, toward said one faces of said first and third belts, whereby said points along the lengths of said first and third belts, respectively, are staggered relative to said points along the lengths of said second and fourth belts and thereby provide an undulating configuration for said one faces of said belts, confining surfaces disposed above and below said one edge of said bill to confine and guide said one edge of said bill, further confining surfaces disposed above and below said opposite edge of said bill to confine and guide said opposite edge of said bill, the first said confining surfaces being spaced apart a distance at least as great as the sum of the heights of an upward and downward undulation of the first said and said second belts, said further confining surfaces being spaced apart a distance at least as great as the sum of the heights of an upward and a downward undulation of said third and said fourth belts.

13. In a bill-transporting device, a belt, pulleys that support said belt, a second belt, pulleys that support said second belt and hold one face of said second belt in confronting relation with one face of the first said belt, a third belt that is spaced from the first said belt, pulleys that support said third belt, a fourth belt that is spaced from said second belt, pulleys that support said fourth belt and hold one face of said fourth belt in confronting relation with one face of said third belt, said one face of said first belt and said one face of said second belt being adapted to grip one edge of a bill but to permit said one edge of said bill to project outwardly beyond said one face of said first belt and said one face of said second belt, said one face of said third belt and said one face of said fourth belt also being adapted to grip the opposite edge of said bill but to permit said opposite edge of said bill to project outwardly beyond said one face of said third belt and said one face of said fourth belt, members that engage said first and third belts at points spaced along the lengths of said first and third belts to bow said one faces of said first and third belts, respectively, toward said one faces of said second and fourth belts, and members that engage said second and fourth belts at points spaced along the lengths of said second and fourth belts to bow said one faces of said second and fourth belts, respectively, toward said one faces of said first and third belts, the members that bow said one faces of said first and third belts, respectively, toward said one faces of said second and fourth belts being displaced from the members that bow said one faces of said second and fourth belts, respectively, toward said one faces of said first and third belts, whereby said points along the lengths of said first and third belts, respectively, are staggered relative to said points along the lengths of said second and fourth belts and thereby provide an undulating configuration for said one faces of said belts, confining surfaces disposed above and below said one edge of said bill to confine and guide said one edge of said bill, further confining surfaces disposed above and below said opposite edge of said bill to confine and guide said opposite edge of said bill, the first said confining surfaces being spaced apart a distance at least as great as the sum of the heights of an upward and a downward undulation of the first said and said second belts, said further confining surfaces being spaced apart a distance at least as great as the sum of the heights of an upward and a downward undulation of said third and said fourth belts.

14. In a bill-transporting device, a belt, pulleys that support said belt, a second belt, pulleys that support said second belt and hold one face of said second belt in confronting relation with one face of the first said belt, a third belt that is spaced from the first said belt, pulleys that support said third belt, a fourth belt that is spaced from said second belt, pulleys that support said fourth belt and hold one face of said fourth belt in confronting relation with one face of said third belt, said one face of said first belt and said one face of said second belt being adapted to grip one edge of a bill but to permit said one edge of said bill to project outwardly beyond said one face of said first belt and said one face of said second belt, said one face of said third belt and said one face of said fourth belt also being adapted to grip the opposite edge of said bill but to permit said opposite edge of said bill to project outwardly beyond said one face of said third belt and said one face of said fourth belt, members that engage said first and third belts to bow said one faces of said first and third belts, respectively, toward said one faces of said second and fourth belts, and members that engage said second and fourth belts to bow said one faces of said second and fourth belts, respectively, toward said one faces of said first and third belts, the members that bow said one faces of said first and third belts, respectively, toward said one faces of said second and fourth belts being displaced from the members that bow said one faces of said second and fourth belts, respectively, toward said one faces of said first and third belts, whereby said belts have an undulating configuration, confining surfaces disposed above and below said one edge of said bill to confine and guide said one edge of said bill, further confining surfaces disposed above and below said opposite edge of said bill to confine and guide said opposite edge of said bill, the first said confining surfaces being spaced apart a distance at least as great as the sum of the heights of an upward and a downward undulation of the first said and said second belts, said further confining surfaces being spaced apart a distance at least as great as the sum of the heights of an upward and a downward undulation of said third and said fourth belts.

15. In a bill-transporting device, a belt, pulleys that support said belt, a second belt, pulleys that support said second belt and hold one face of said second belt in confronting relation with one face of the first said belt, a third belt that is spaced from the first said belt, pulleys that support said third belt, a fourth belt that is spaced from said second belt, pulleys that support said fourth belt and hold one face of said fourth belt in confronting relation with one face of said third belt, said one face of said first belt and said one face of said second belt being adapted to grip one edge of a bill but to permit said one edge of said bill to project outwardly beyond said one face of said first belt and said one face of said second belt, said one face of said third belt and said one face of said fourth belt also being adapted to grip the opposite edge of said bill but to permit said opposite edge of said bill to project outwardly beyond said one face of said third belt and said one face of said fourth belt, members that engage said first and third belts to urge said one faces of said first and third belts, respectively, toward said one faces of said second and fourth belts, and members that engage said second and fourth belts to urge said one faces of said second and fourth belts, respectively, toward said one faces of said first and third belts, the members that urge said one faces of said first and third belts, respectively, toward said one faces of said second and fourth belts and the members that urge said one faces of said second and fourth belts, respectively, toward said one faces of said first and third belts providing pressure points spaced along the lengths of said belts where said belts recurrently press against the opposite faces of said bill, confining surfaces disposed above and below said one edge of said bill to confine and guide said one edge of said bill, further confining surfaces disposed above and below said opposite edge of said bill to confine and guide said opposite edge of said bill.

16. In a bill-transporting device, a belt, pulleys that support said belt, a second belt, pulleys that support said second belt and hold one face of said second belt in confronting relation with one face of the first said belt, said one face of said first belt and said one face of said second belt being adapted to grip one edge of a bill but to permit said one edge of said bill to project outwardly beyond said one face of said first belt and said one face of said second belt, a member that engages said first belt and urges said one face of said first belt toward said one face of said second belt, a member that engages said second belt and urges said one face of said second belt toward said one face of said first belt, said members providing undulating configurations for said belts and thereby providing an undulating configuration for said edge of said bill, a magnetic head with a bill-engaging face and a pressure member that are displaced inwardly of said belts and that are adapted to engage a portion of said bill that is displaced from said one edge of said bill, said belts providing an undulating configuration for said one edge of said bill but permitting said portion of said bill which is engaged by said bill-engaging face of said magnetic head and said pressure member to be pressed intimately against, and to assume a configuration complementary to, said bill-engaging face of said magnetic head, and confining surfaces that overlie said edge of said bill and keep said edge of said bill from bowing upwardly or downwardly to an extent greater than the amplitude of said undulations.

17. In a bill-transporting device, a belt, pulleys that support said belt, a second belt, pulleys that support said second belt and hold one face of said second belt in confronting relation with one face of the first said belt, said one face of said first belt and said one face of said second belt being adapted to grip one edge of a bill but to permit said one edge of said bill to project outwardly beyond said one face of said first belt and said one face of said second belt, a member that engages said first belt and urges said one face of said first belt toward said one face of said second belt, a member that engages said second belt and urges said one face of said second belt toward said one face of said first belt, the member that urges said one face of said first belt toward said one face of said second belt and said member that urges said one face of said second belt toward said one face of said first belt providing pressure points spaced along the lengths of said belts where said belts recurrently press against the opposite faces of said bill and thereby bow said one edge of said bill upwardly and downwardly, a bill sensing element that is displaced inwardly of said belts and that is adapted to sense a portion of said bill that is displaced from said one edge of said bill, said belts providing an undulating configuration for said one edge of said bill but permitting said portion of said bill which is sensed by said bill sensing element to have a configuration other than said undulating configuration, and confining surfaces that overlie said edge of said bill and keep said edge of said bill from bowing upwardly or downwardly extensively.

18. In a currency detector, bill-gripping members that are adapted to grip an inserted bill and to move said bill along a predetermined path, a magnetic head that is disposed adjacent said path, a mounting for said magnetic head that is movable transversely of said path to permit limited movement of said magnetic head transversely of said path, a spring that biases said mounting and said magnetic head toward said path but that can yield to permit said mounting and said magnetic head to move away from said path, a stop that limits the movement of said mounting and said magnetic head away from said path, and a member that is movable toward said magnetic head to urge said bill into intimate engagement with said magnetic head and to then cause said magnetic head and said mounting to move away from said path.

19. In a currency detector, bill-gripping members that are adapted to grip an inserted bill and to move said bill along a predetermined path, a magnetic head that is disposed adjacent said path, a mounting for said magnetic head that is movable transversely of said path to permit limited movement of said magnetic head transversely of said path, a spring that biases said mounting and said magnetic head toward said path but that can yield to permit said mounting and said magnetic head to move away from said path, a stop that limits the movement of said mounting and said magnetic head, a member that is movable toward said magnetic head to urge said bill into intimate engagement with said magnetic head, and an actuator that moves said member toward said magnetic head, said actuator having a part that moves said member against said bill and that moves said bill against said magnetic head before said part reaches the end of its stroke, said spring yielding and said magnetic head and said mounting moving away from said path to permit said part to reach the end of its stroke.

20. In a currency detector, bill-gripping members that are adapted to grip an inserted bill and to move said bill along a predetermined path, a magnetic head that is disposed adjacent said path, a mounting for said magnetic head that is movable transversely of said path to permit limited movement of said magnetic head transversely of said path, a member that is movable toward said magnetic head to urge said bill into intimate engagement with said magnetic head, and an actuator that moves said member toward said magnetic head, said actuator having a part that moves said member against said bill and that moves said bill against said magnetic head before said part reaches the end of its stroke, said actuator being electromagnetic, said magnetic head and said mounting moving away from said path to permit said part to reach the end of its stroke.

21. A currency detector, bill-gripping members that are adapted to grip an inserted bill and to move said bill along a predetermined path, a magnetic head that is disposed adjacent said path but is movable transversely of said path, a member that is movable toward said magnetic head to urge said bill into intimate engagement with said magnetic head, and an actuator that moves said member toward said magnetic head, said actuator having a part that moves said member against said bill and that moves said bill against said magnetic head before said part reaches the end of its stroke, said magnetic head moving transversely of said path to permit said part to reach the end of its stroke.

22. In a currency detector, bill-gripping members that are adapted to grip an inserted bill and to move said bill along a predetermined path, a magnetic head that is disposed adjacent said path, a mounting for said magnetic head that is movable transversely of said path to permit limited movement of said magnetic head transversely of said path, a spring that biases said mounting and said magnetic head toward said path but that can yield to permit said mounting and said magnetic head to move away from said path, a stop that limits the movement of said mounting and said magnetic head away from said path, and a member that is movable toward said magnetic head to urge said bill into intimate engagement with said magnetic head and to then cause said magnetic head and said mounting to move away from said path, said stop being adjustable to permit adjustment of the initial position of said magnetic head relative to said member and to permit adjustment of the initial stress in said spring.

23. In a currency detector, bill-gripping members that are adapted to grip an inserted bill and to move said bill along a predetermined path, a magnetic head that is disposed adjacent said path, and a member that is movable toward said magnetic head to urge said bill into intimate engagement with said magnetic head, said member being a roller that has a soft face which is readily deformable to assume a configuration that is complementary to the configuration of the gap-containing face of said magnetic head.

24. In a currency detector, bill-gripping members that are adapted to grip an inserted bill and to move said bill along a predetermined path, a magnetic head that is disposed adjacent said path, and a member that is movable toward said magnetic head to urge said bill into intimate engagement with said magnetic head, said member being a roller that is mounted on and freely rotatable relative to a pivot, said roller having a soft face which is readily deformable to assume a configuration that is complementary to the configuration of the gap-containing face of said magnetic head, said soft face of said roller engaging and being driven by said bill, said soft face of said roller deforming progressively to assume a configuration complementary to the configuration of said gap-containing face of said magnetic head as said roller is driven by said bill.

25. In a currency detector, bill-gripping members that are adapted to grip an inserted bill and to move said bill along a predetermined path, a magnetic head that is disposed adjacent said path but is movable transversely of said path, a member that is movable toward said magnetic head to urge said bill into intimate engagement with said magnetic head, and an actuator that moves said member toward said magnetic head, said actuator having a part that moves said member against said bill and that moves said bill against said magnetic head before said part reaches the end of its stroke, said magnetic head moving transversely of said path to permit said part to reach the end of its stroke, said member being a roller that has a soft face which is readily deformable to assume a configuration that is complementary to the configuration of the gap-containing face of said magnetic head.

26. In a bill-transporting device, bill-gripping members that are adapted to grip a bill and to move that bill along a predetermined path, a plurality of switches that are spaced along the length of said path, actuators for said switches that normally extend into said path but that can be engaged by said bill and moved out of said path, and a motor to drive said bill-gripping members, said switches and said actuators being close enough together to keep said motor energized until said bill has been tested and is substantially discharged from said device.

27. In a bill-transporting device, bill-gripping members that can grip a bill and move said bill along a predetermined path, rollers that are adjacent the far end of said path and that can accept said bill from said bill-gripping members and deliver said bill to a discharge area, and a source of rotation for said rollers, said source of rotation including a reversible motor and clutch members, said motor and said clutch members rotating said rollers in the bill-delivering direction whenever said motor is rotating in the bill-advancing direction, said motor and said clutch members permitting said rollers to remain stationary whenever said motor is rotating in the bill-returning direction.

28. In a bill-transporting device, bill-gripping members that can grip a bill and move said bill along a predetermined path, rollers that are adjacent the far end of said path and that can accept said bill from said bill-gripping members and deliver said bill to a discharge area, and a source of rotation for said rollers, said source of rotation including a reversible motor and clutch members, said motor and said clutch members rotating said rollers in the bill-delivering direction whenever said rotor is rotating in the bill-advancing direction, said motor and said clutch members permitting said rollers to remain stationary whenever said motor is rotating in the bill-returning direction, said clutch members having complementary toothed faces that dive in just one direction, said rollers having soft faces and being disposed so that soft faces are always deformed by their engagement with each other.

29. In a bill-transporting device, bill-gripping members that can grip a bill and move said bill along a predetermined path, rollers, that are adjacent the far end of said path and that can accept said bill from said bill-gripping members and deliver said bill to a discharge area, and a source of rotation for said rollers, said source of rotation including a rotatable shaft, a pulley loosely mounted on said shaft, a second pulley that drives at least one of said rollers, a belt encircling and engaging said pulleys, and a helical spring that encircles and rotates with said shaft and that is connected to the first said pulley, said pulleys being dimensioned to rotate said rollers so the peripheral speeds of said rollers are greater than the speed at which said bill-gripping members move said bill, said rollers being limited to reduced peripheral speeds equal to said speed at which said bill-gripping members move said bill whenever said bill is simultaneously engaged by said rollers and said bill-gripping members, said spring yielding to permit the first said pulley to rotate at a correspondingly reduced speed until said bill is released by said bill-gripping members and then restoring itself to rotate said rollers at a faster-than-normal rate and thereby speed up the movement of said bill as said bill is delivered to said discharge area.

30. In a bill-transporting device, bill-gripping members that can grip a bill and move said bill along a predetermined path, rollers that are adjacent the far end of said path and that can accept said bill from said bill-gripping members and deliver said bill to a discharge area, and a source of rotation for said rollers, said source of rotation including a rotatable shaft, a pulley rotatable relative to said shaft, a second pulley that drives at least one of said rollers, a belt that interconnects said pulleys, and a spring that rotates with said shaft and that drives the first said pulley, said pulleys being dimensioned to rotate said rollers so the peripheral speeds of said rollers are greater than the speed at which said bill-gripping members move said bill, said bill holding said rollers to reduced peripheral speeds equal to the speed at which said bill-gripping members move said bill whenever said bill is simultaneously engaged by said rollers and said bill-gripping members, said spring yielding to permit the first said pulley to rotate at a speed corresponding to said reduced peripheral speeds until said bill is released by said bill-gripping members and then rotating said rollers at a faster-than-normal rate.

31. In a bill-transporting device, bill-gripping members that can grip a bill and move said bill along a predetermined path, a reversible motor that drives said bill-gripping members in the forward direction and also drives said bill-gripping members in the reverse direction, a sensing system that senses for the authenticity of said bill, and a bill-actuated switch that is engaged by the leading edge of said bill after said bill has been sensed, said switch coacting with said sensing system to permit said motor to continue to drive said bill-gripping members in the forward direction if said bill is authentic but coacting with said sensing system to cause said motor to drive said bill-gripping members in the reverse direction if said bill is not authentic, said switch being engaged by said bill when said bill is spaced from the far end of said path a distance that is almost equal to one half the length of said path.

32. In a bill-transporting device, bill-gripping members that can grip a bill and move said bill along a predetermined path, a reversible motor that drives said bill-gripping members in the forward direction and also drives said bill-gripping members in the reverse direction, a sensing system that senses for the authenticity of said bill, and a bill-actuated switch that is engaged by the leading edge of said bill after said bill has been sensed, said switch coacting with said sensing system to permit said motor to continue to drive said bill-gripping members in the forward direction if said bill is authentic but coacting with said sensing system to cause said motor to drive said bill-gripping members in the reverse direction if said bill is not authentic.

33. In a bill-transporting device, bill-gripping members that can grip a bill and move said bill along a predetermined path, a motor that drives said bill-gripping members, a sensing system that senses for the authenticity of said bill, a bill-actuated switch that is engaged by the leading edge of said bill after said bill has been sensed, a means that senses for the presence or absence of a thread, tape or other member attached to said bill, and a bill-actuated accept switch adjacent the far end of said path, the first said bill-actuated switch coacting with said sensing system to permit said motor to continue to drive said bill-gripping members toward said far end of said path if said bill is authentic, said sensing means coacting with said bill-actuated accept switch to supply an accept signal if said bill is free of a thread, tape or other member, the first said bill-actuated switch coacting with said sensing system to keep said motor from continuing to drive said bill-gripping members toward said far end of said path if said bill is not authentic, said sensing means coacting with said bill-actuated accept switch to prevent the supplying of an accept signal if said bill is not free of a thread, tape or other member.

34. In a bill-transporting device, bill-gripping members that can grip a bill and move said bill along a predetermined path, a motor that drives said bill-gripping members, a means that senses for the presence or absence of a thread, tape or other member attached to said bill, and a bill-actuated accept switch, said sensing means coacting with said bill-actuated accept switch to supply an accept signal if said bill is free of a thread, tape or other member, said sensing means coacting with said bill-actuated accept switch to prevent the supplying of an accept signal if said bill is not free of a thread, tape or other member.

35. In a bill-transporting device, bill-gripping members that can grip a bill and move said bill along a predetermined path, a magnetic head disposed adjacent said path, a member that is movable toward said magnetic head to force said bill into intimate engagement with the gap-containing face of said magnetic head, an electromagnetic member to move said movable member toward said magnetic head, and a means that can respond to the presence of a bill held by said bill-gripping members to energize said electromagnetic member, said means energizing said electromagnetic member only after said bill-gripping members have moved the leading edge of said bill into position between said movable member and said magnetic head.

36. In a bill-transporting device, bill-gripping members that can grip a bill and move said bill along a predetermined path, a magnetic head disposed adjacent said path, a member that is movable toward said magnetic head to force said bill into intimate engagement with the gap-containing face of said magnetic head, an electromagnetic member to move said movable member toward said magnetic head, and a bill-actuated switch that can energize said electromagnetic member, said switch having the actuator thereof disposed beyond said magnetic head whereby said movable member is not moved toward said magnetic head until after the leading edge of said bill has passed beyond said magnetic head.

37. In a bill-transporting device, bill-gripping members that can grip a bill and move said bill along a predetermined path, a magnetic head disposed adjacent said path, a member that is movable toward said magnetic head to force said bill into intimate engagement with the gap-containing face of said magnetic head, an electromagnetic member to move said movable member toward said magnetic head, and a means that can respond to the presence of a bill held by said bill-gripping members to energize said electromagnetic member, said electromagnetic member being energized during part of the forward movement of said bill-gripping members, said means energizing said electromagnetic member only after said bill-gripping members have moved the leading edge of said bill into position between said movable member and said magnetic head, said electromagnetic member being deenergized throughout all of the reverse movement of said bill-gripping members.

38. In a bill-transporting device, bill-gripping members that can grip a bill and move said bill along a predetermined path, a reversible motor that drives said bill-gripping members in the forward direction and also drives said bill-gripping members in the reverse direction, a switch that senses for the presence or absence of a thread, tape or other member attached to said bill, and a bill-actuated accept switch, said sensing switch coacting with said bill-actuated accept switch to prevent reversal of said motor and to supply an accept signal if said bill is free of a thread, tape or other member, said sensing switch coacting with said bill-actuated accept switch to reverse said motor and to prevent the supplying of an accept signal if said bill is not free of a thread, tape or other member.

39. In a bill-transporting device, bill-gripping members that can grip a bill and move said bill along a predetermined path, a plate having a bill-receiving opening therein, a gate movably mounted adjacent said plate, said gate having a bill-receiving opening therein, a member that normally holds said gate so said bill-receiving opening in said gate is in register wtih said bill-receiving opening in said plate but being movable to release said gate for movement to a position wherein said bill-receiving opening in said gate is out of register with said bill-receiving opening in said plate, said gate responding to a thread, tape or other member attached to said bill to stop short of said position wherein said bill-receiving opening in said gate is out of register with said bill-receiving opening in said plate, and a switch that has its movable contact in one position whenever said member holds said gate so said bill-receiving opening in said gate is in register with said bill-receiving opening in said plate and that has its movable member in a second position whenever said gate has moved to said position wherein said bill-receiving opening in said gate is out of register with said bill-receiving opening in said plate, said switch serving to prevent the supplying of an accept signal if said bill is not free of a thread, tape or other member.

40. In a bill-transporting device, bill-gripping members that can grip a bill and move said bill along a predetermined path, a plate having a bill-receiving opening therein, a gate movably mounted adjacent said plate, said gate having a bill-receiving opening therein, a member that normally holds said gate so said bill-receiving opening in said gate is in register wtih said bill-receiving opening in said plate but being movable to release said gate for movement to a position wherein said bill-receiving opening in said gate is out of register with said bill-receiving opening in said plate, said gate responding to a thread, tape or other member attached to said bill to stop short of said position wherein said bill-receiving opening in said gate is out of register with said bill-receiving opening in said plate, and a switch that has its movable contact in one position whenever said member holds said gate so said bill-receiving opening in said gate is in register with said bill-receiving opening in said plate and that has its movable member in a second position whenever said gate has moved to said position wherein said bill-receiving opening in said gate is out of register with said bill-receiving opening in said plate, said switch serving to prevent the supplying of an accept signal if said bill is not free of a thread, tape or other member, said member being movable to release said gate after said bill have moved through part of said path.

41. In a bill-transporting device, bill-gripping members that can grip a bill and move said bill along a predetermined path, a plate having a bill-receiving opening therein, a gate movably mounted adjacent said plate, said gate having a bill-receiving opening therein, a member that normally holds said gate so said bill-receiving opening in said gate is in register with said bill-receiving opening in said plate but being movable to release said gate for movement to a position wherein said bill-receiving opening in said gate is out of register with said bill-receiving opening in said plate, said gate responding to a thread, tape or other member attached to said bill to stop short of said position wherein said bill-receiving opening in said gate is out of register with said bill-receiving opening in said plate, and a switch that has its movable contact in one position whenever said member holds said gate so said bill-receiving opening in said gate is in register with said bill-receiving opening in said plate and that has its movable member in a second position whenever said gate has moved to said position wherein said bill-receiving opening in said gate is out of register with said bill-receiving opening in said plate, said switch serving to prevent the supplying of an accept signal if said bill is not free of a thread, tape or other member, said gate serving, when in said position wherein said bill-receiving opening in said gate is out of register with said bill-receiving opening in said plate to prevent the introduction through said bill-receiving openings of a further bill.

42. In a bill-transporting device, bill-gripping members that can grip a bill and move said bill along a predetermined path, a plate having a bill-receiving opening therein, a gate movably mounted adjacent said plate, said gate having a bill-receiving opening therein, a member that normally holds said gate so said bill-receiving opening in said gate is in register with said bill-receiving opening in said plate but being movable to release said gate for movement to a position wherein said bill-receiving opening in said gate is out of register with said bill-receiving opening in said plate, said gate responding to a thread, tape or other member attached to said bill to stop short of said position wherein said bill-receiving opening in said gate is out of register with said bill-recieving opening in said plate, a sensing system that senses for the authenticity of said bill, and a switch that has its movable contact in one position whenever said member holds said gate so said bill-receiving opening in said gate is in register with said bill-receiving opening in said plate and that has its movable member in a second position whenever said gate has moved to said position wherein said bill-receiving opening in said gate is out of register with said bill-receiving opening in said plate, said switch serving to prevent the supplying of an accept signal if said bill is not free of a thread, tape or other member, said sensing system responding to an authentic bill to cause said member to release said gate.

43. In a bill-transporting device, bill-gripping members that are adapted to grip a bill and to move that bill along a predetermined path which is longer than said bill, a plurality of bill-responsive means that are spaced along the length of said path, each of said means being directly responsive to a bill that is moved along said path by said bill-gripping members, a motor to drive said bill-gripping members, and a circuit for said motor that includes said bill-responsive means, said bill-responsive means successively responding to a bill that is moved along said path by said bill-gripping members to act through said circuit to keep said motor energized, said bill-responsive means being close enough to each other to keep said motor energized until after said bill has been moved through said predetermined path.

References Cited by the Examiner
UNITED STATES PATENTS

| | | | |
|---|---|---|---|
| 1,436,543 | 11/1922 | Spence | 271—69 |
| 2,071,139 | 2/1937 | Payne | 101—235 |
| 2,076,493 | 4/1937 | Beardsley | 198—165 |
| 2,081,280 | 5/1937 | Pearl | 226—172 XR |
| 2,314,027 | 3/1943 | Young | 271—45 X |
| 2,597,675 | 5/1952 | Sackett | 226—180 X |
| 2,731,621 | 1/1956 | Sontheimer. | |
| 2,802,905 | 8/1957 | Taris. | |
| 2,827,822 | 3/1958 | Timms. | |
| 2,932,392 | 4/1960 | Burtner. | |
| 2,951,164 | 8/1960 | Timms. | |
| 2,957,387 | 10/1960 | Patzer. | |
| 2,960,377 | 11/1960 | Simjian | 194—4 |
| 2,961,649 | 11/1960 | Eldredge. | |
| 2,967,452 | 1/1961 | Patzer. | |
| 2,995,976 | 8/1961 | Weingart | 194—4 X |
| 3,132,737 | 5/1964 | Moon et al. | |

ROBERT B. REEVES, *Primary Examiner.*

CLAUDE A. LE ROY, ROBERT C. RIORDON, ERNEST A. FALLER, RAPHAEL M. LUPO, *Examiners.*

V. L. RAMIK, E. D. DREYFUS, *Assistant Examiners.*